United States Patent [19]
Sunstein

[11] 3,977,022
[45] Aug. 24, 1976

[54] CATHODE-RAY TUBE IMAGE PRESENTATION SYSTEM OF THE INDEXING TYPE AND TIMING SYSTEM USEFUL THEREWITH

[76] Inventor: David E. Sunstein, 464 Conshohocken State Road, Bala Cynwyd, Pa. 19004

[22] Filed: Jan. 3, 1972

[21] Appl. No.: 214,888

[52] U.S. Cl. .................................................. 358/67
[51] Int. Cl.² .......................................... H04N 9/24
[58] Field of Search ...................... 178/5.4 F, 5.4 H; 358/74, 64, 66

[56] References Cited
UNITED STATES PATENTS

| | | | |
|---|---|---|---|
| 2,259,538 | 10/1941 | Wheeler | 178/7.5 DC |
| 2,723,306 | 11/1955 | Creamer, Jr. | 178/5.4 F |
| 2,773,117 | 12/1956 | Clapp et al. | 178/5.4 F |
| 2,905,752 | 9/1959 | Loughlin | 178/5.4 F |
| 2,945,087 | 7/1960 | Graham et al. | 178/5.4 F |
| 2,967,210 | 1/1961 | Kell | 178/5.4 F |
| 3,009,989 | 11/1961 | Ahrons et al. | 178/7.5 R |
| 3,013,113 | 12/1961 | Sunstein | 178/5.4 F |
| 3,213,190 | 10/1965 | Mutschler | 178/5.4 F |
| 3,234,324 | 2/1966 | Mutschler | 178/5.4 F |
| 3,283,064 | 11/1966 | Cornelissen et al. | 178/5.4 F |
| 3,301,944 | 1/1967 | Cornelissen et al. | 178/5.4 F |
| 3,315,033 | 4/1967 | Sennhenn et al. | 178/7.3 DC |
| 3,322,895 | 5/1967 | Loughlin | 178/7.5 DC |
| 3,405,311 | 10/1968 | Brainard et al. | 315/22 X |
| 3,562,409 | 2/1971 | Freeman et al. | 178/5.4 H |
| 3,597,540 | 8/1971 | MacIntyre, Jr. | 178/7.5 R |
| 3,602,642 | 8/1971 | Avoort et al. | 178/7.5 R |
| 3,674,932 | 7/1972 | Griepentrog | 178/7.5 R |
| 3,737,563 | 6/1973 | Ketelaar | 358/26 |

FOREIGN PATENTS OR APPLICATIONS

| | | | |
|---|---|---|---|
| 954,941 | 4/1964 | United Kingdom | 178/5.4 F |

Primary Examiner—George G. Stellar
Attorney, Agent, or Firm—Howson and Howson

[57] ABSTRACT

A color television image presentation cathode-ray tube with running indexing elements as the beam scans horizontally across the stripes, an index signal is produced representative of beam position with respect to the different colored stripes. The minimum intensity of the beam while scanning the image-presentation portion of the cathode-ray tube is automatically maintained at a near-optimum value sufficient to produce an adequate strength of indexing signal without unduly illuminating those portions of the picture intended to be black. When the strength of the beam current would otherwise tend to become too small, the blackest part of the picture is shifted in the direction to increase the beam intensity and the indexing signals. Sensing the index signal strength is made to be ineffective when the beam scans beyond the confines of the area containing the indexing elements by deriving a signal representing the cathode-ray tube cathode current, averaged over a short interval, and operating an electronic switch to disconnect the control means from the source of index signals only when said cathode current is above a predetermined minimum and the index signals are below a predetermined level. This same arrangement initiates beam blanking, and the end of the horizontal fly-back pulse initiates application of a pedestal pulse to control the beam-intensity at the beginning of each horizontal line to provide the beam current for energizing starting index elements. The pedestal is automatically terminated in response to the occurrence of proper signal from the index circuits; and the beam intensity thereafter is controlled on each line by the picture signal as above.

51 Claims, 20 Drawing Figures

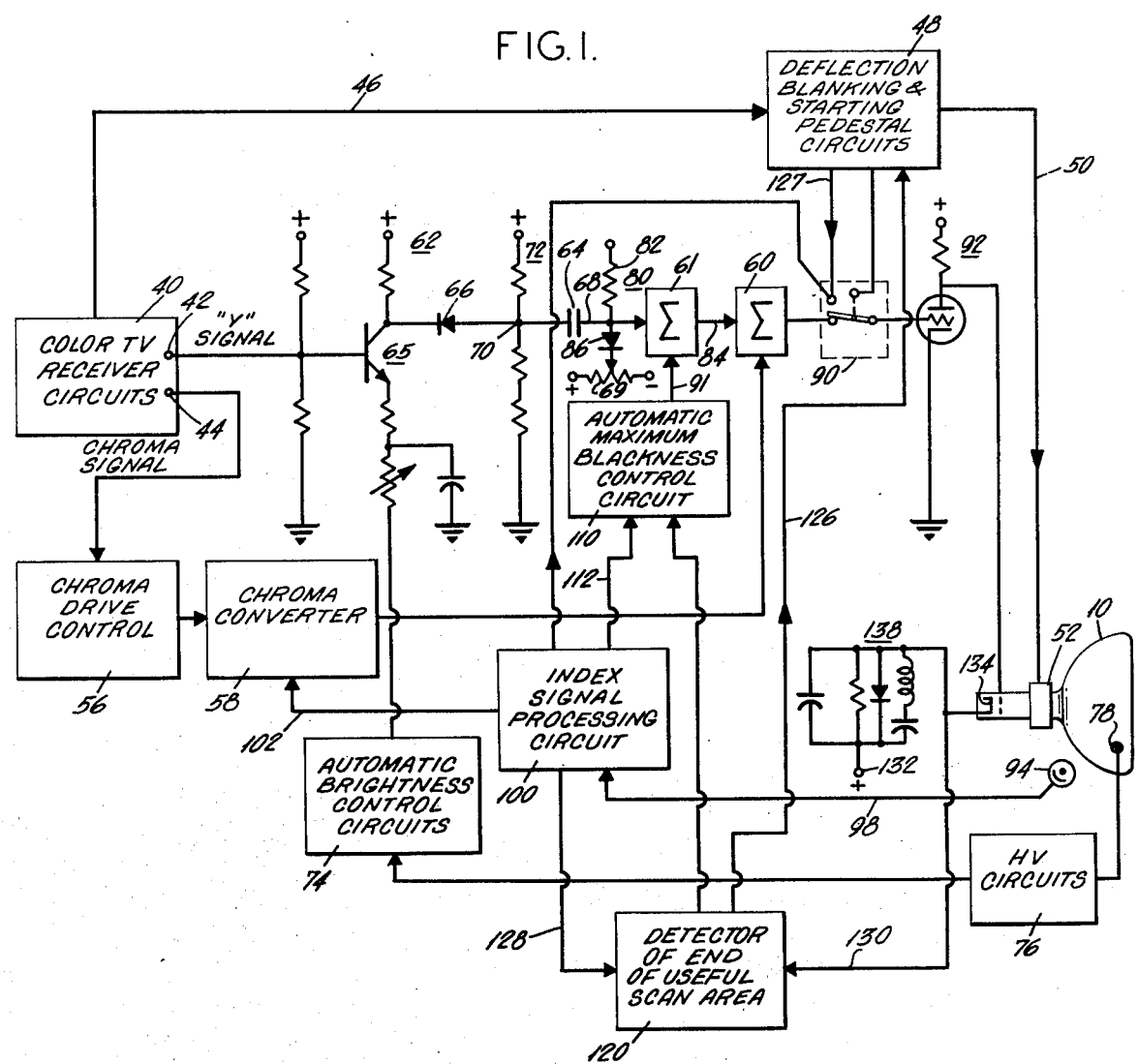
FIG. 1.
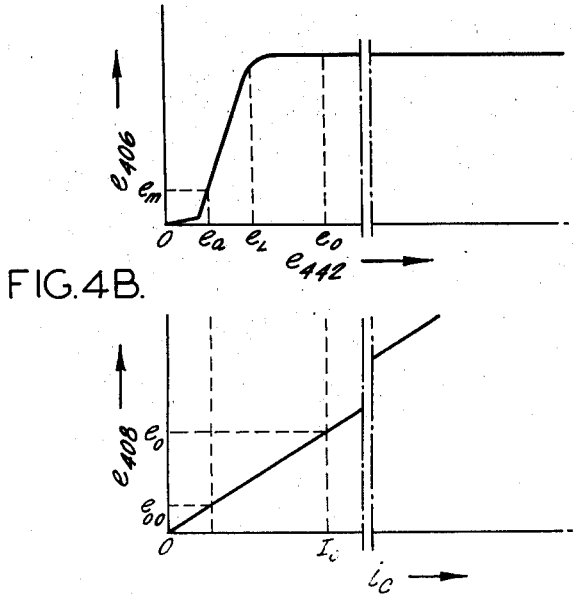
FIG. 4A.
FIG. 4B.
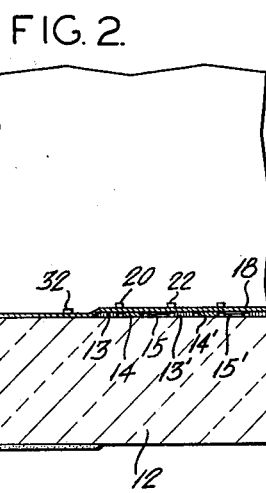
FIG. 2.

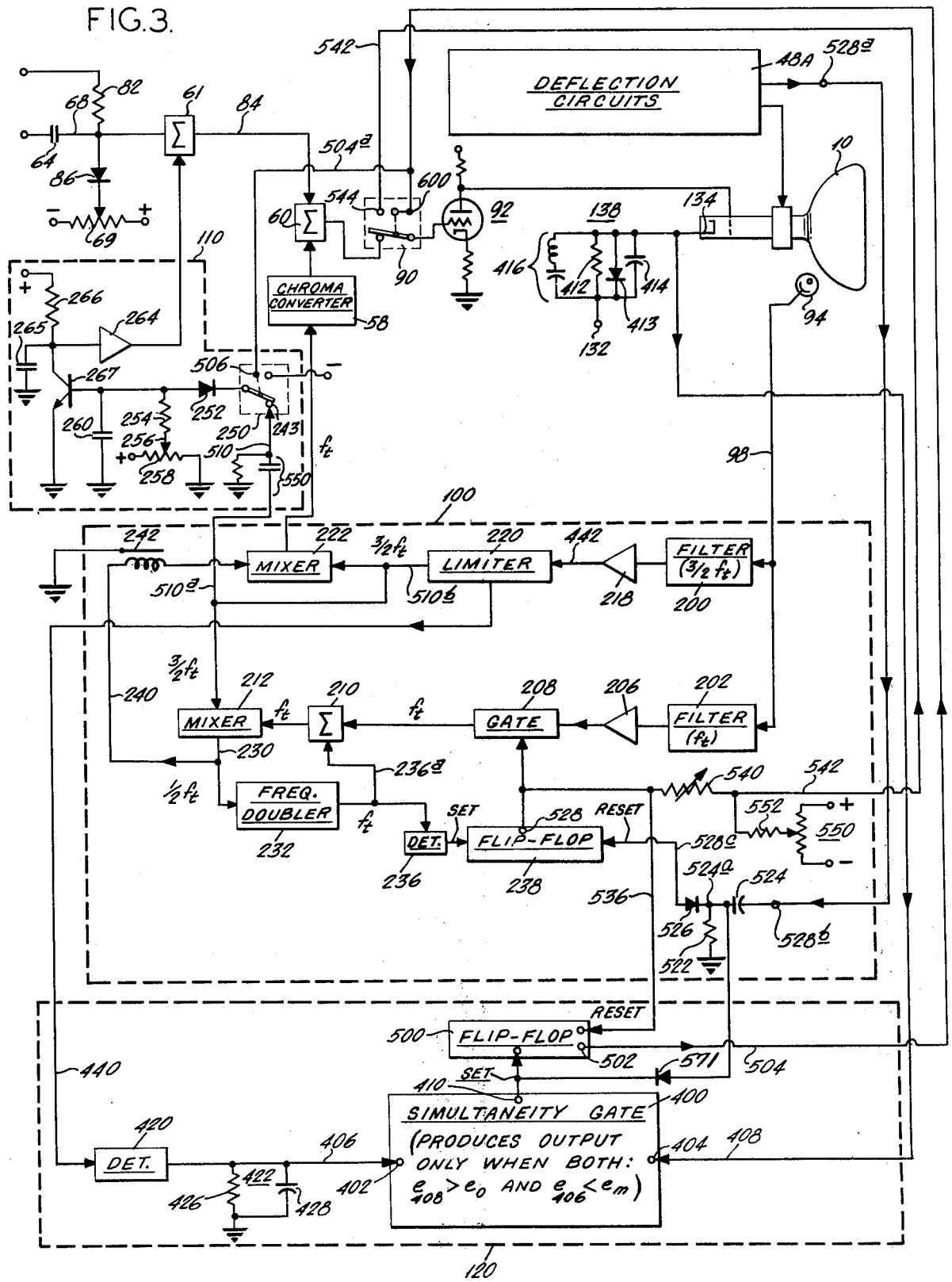

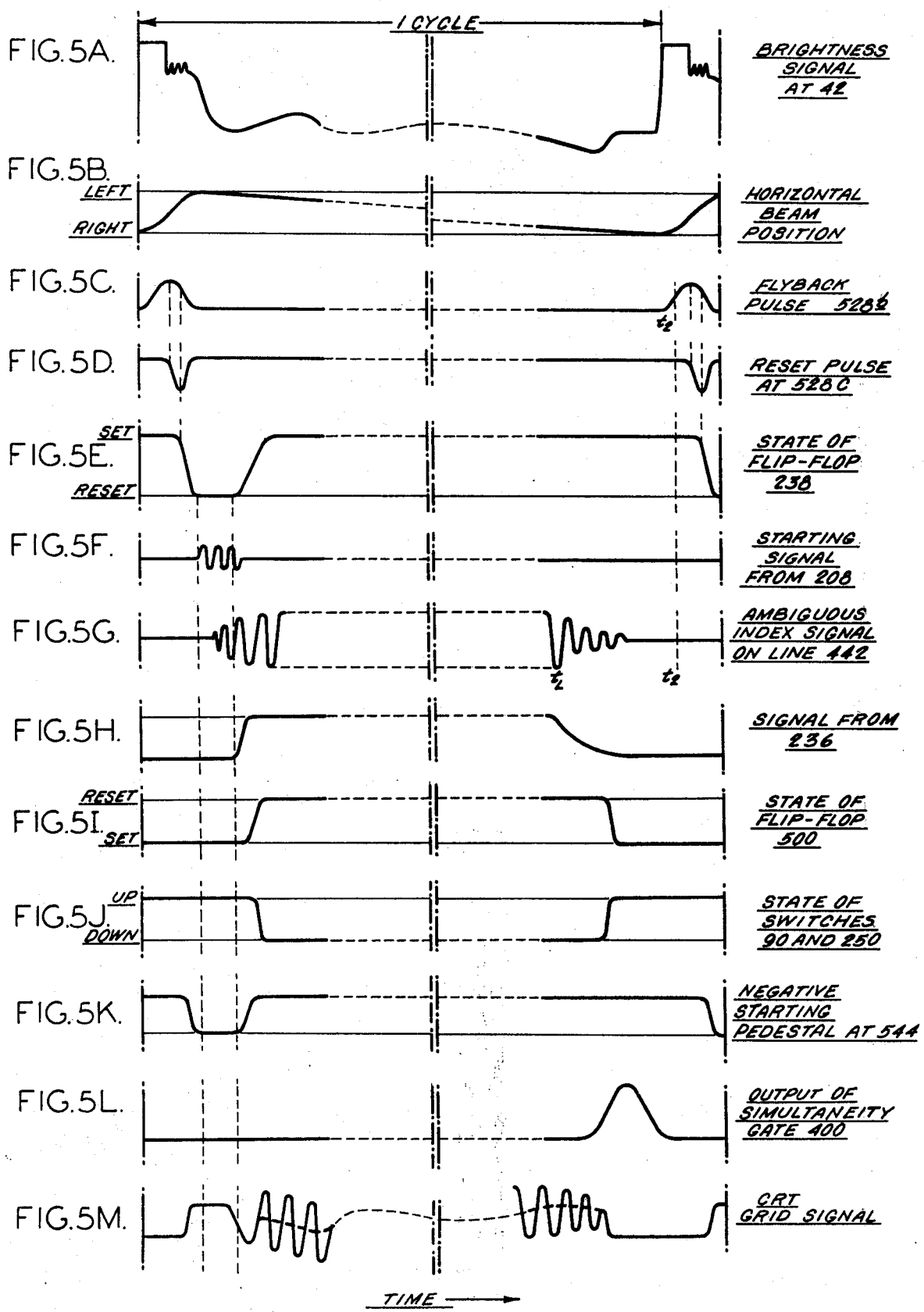

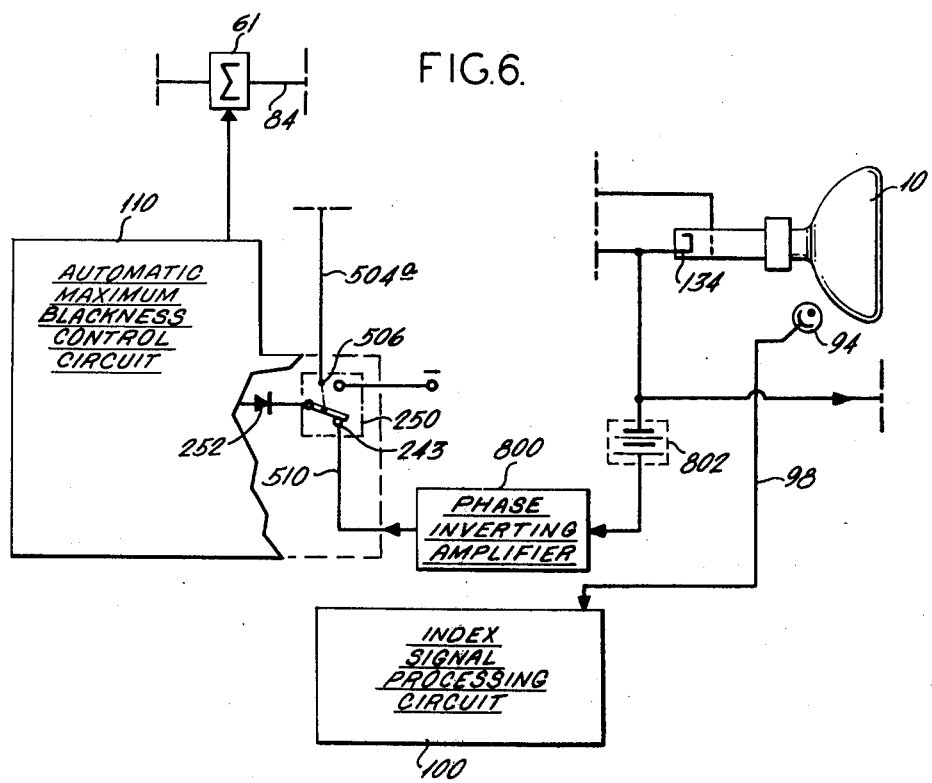
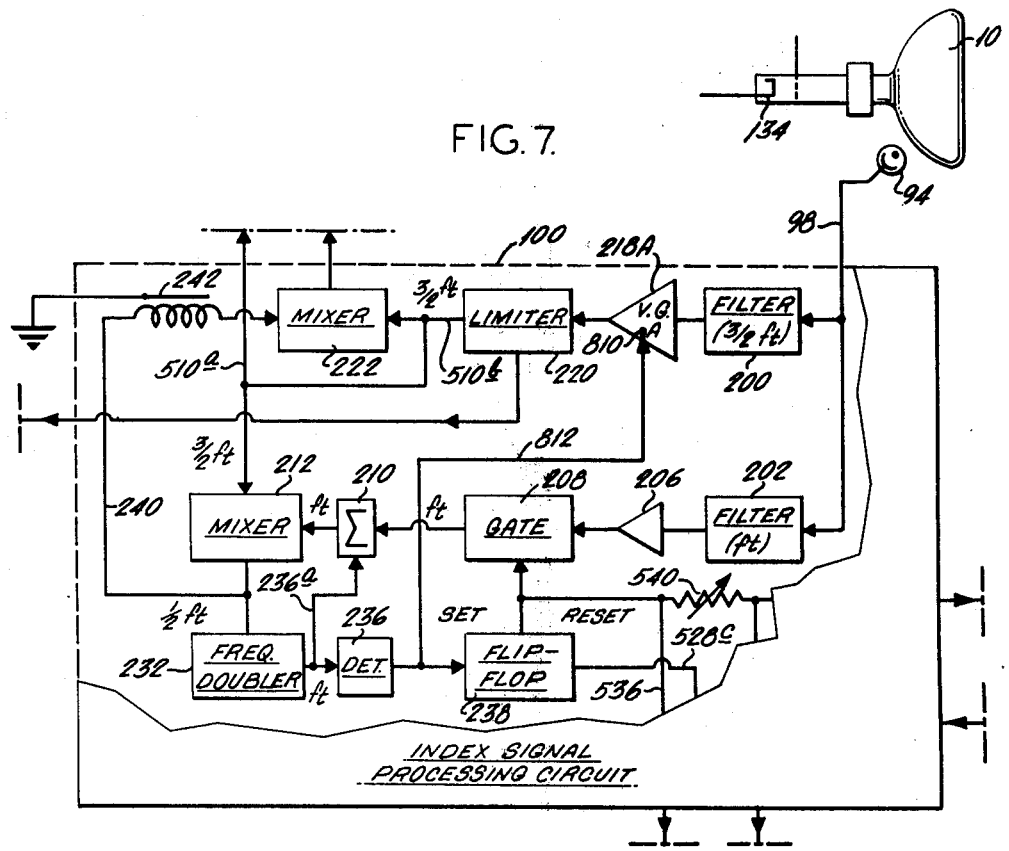

CATHODE-RAY TUBE IMAGE PRESENTATION SYSTEM OF THE INDEXING TYPE AND TIMING SYSTEM USEFUL THEREWITH

BACKGROUND OF THE INVENTION

This invention relates to image presentation systems of the type employing a cathode-ray tube containing indexing elements for producing index signals indicative of cathode-ray beam-position, and especially to apparatus for maintaining the cathode-ray beam at an intensity sufficient to insure production of indexing signals of adequate strength without producing minimum beam intensities greater than are necessary for this purpose, and to apparatus for controlling the timing of blanking and pedestal pulses preferably utilized in such a system. More particularly, it relates in its preferred forms to apparatus for maintaining the minimum intensity of the cathode-ray beam in a color television system of the indexing type at a level which will provide the blackest possible appearance of those areas of the image intended to be substantially black or completely black while at the same time assuring adequate index signal. The invention also relates, in one respect, to apparatus for initiating horizontal blanking as soon as the beam leaves the image-presentation portion of the tube containing the indexing element and for providing a fixed pedestal of predetermined magnitude and controlled duration at the beginning of each horizontal line so as to provide suitable and reliable generation of index starting signals from starting index elements positioned near the beginning of each horizontal scan, and for providing other timing functions.

Image presentation systems are known in the prior art in which a cathode-ray tube is provided with an image display area on which an image is reproduced in response to repetitive horizontal scanning thereof by the cathode-ray beam, the intensity of the beam being controlled during its scanning so as to effect the desired image reproduction, and in which beam-position indicating index elements are located within the tube and within the area in which the image is reproduced so that, as the beam scans across the indexing elements, these elements produce an index signal representative of the instantaneous position of the beam. An example of such system, with particular reference to which the present invention will be described, comprises a color television image presentation system in which the image-reproduction area of the cathode-ray tube is covered with vertically-extending groups, typically triplets, of lines or stripes responsive to impingement by the beam to produce light of different colors. Each of the lines of each group, or triplet, produces a different color of light (typically red, green and blue) in response to beam impingement, and the groups or triplets are preferably substantially identical with each other and extend laterally adjacent each other across the entire inside face of the tube. The indexing elements, which may be light emitting indexing elements for example, are positioned in predetermined geometric relation to the sets of viewing phosphor lines, preferably so as to be scanned by the beam at a rate which is in odd integral half-multiple of the rate at which the triplets are scanned; for example, the index elements may be scanned at 3/2 the rate at which triplets are scanned.

Systems of the class identified above are described and claimed in my issued U.S. Pat. No. 3,013,113, issued Dec. 12, 1961; in my U.S. Pat. No. 2,892,123, issued June 23, 1959; in my U.S. Pat. No. 3,305,788, issued Feb. 21, 1967; in my co-pending application Ser. No. 132,692, filed Apr. 9, 1971.

In such systems, the indexing signals derived are normally processed and combined with received color television chroma signals in an appropriate manner such that the resultant signal used to control the chroma of the reproduced image recurs at the same rate as the rate at which the triplets are scanned, thereby in effect synchronizing the received chroma-controlling information with the scanning of the cathode-ray tube beam across the phosphor elements. A signal at least approximately representative of the brightness of the image to be reproduced is also generally applied to the beam-intensity controlling means for the cathode-ray tube, so that the reproduced image will have both proper brightness and proper color.

In such systems, the strength of the index signals produced depends upon the intensity of the cathode-ray beam impinging the index elements. If the beam intensity during impingement of the index elements is too small, either there will be no indexing signal produced or else the indexing signal produced will be inadequate in strength to operate properly the circuits to which it is supplied. Since in most cases, for example in color television systems of the type referred to above, the signal applied to the beam-intensity controlling means of the cathode-ray tube varies widely as a function of picture content, some affirmative measure must be taken to prevent the beam intensity from decreasing below the point at which the index signal becomes inadequate. At the same time, if the minimum beam intensity is set too high, then the minimum illumination in the reproduced image will also be relatively high; in the case of a color television system, this will set a limit on the maximum black which can be represented, and portions of the image which are intended to be completely black will emit a predetermined amount of light determined by the minimum beam intensity. It is of course desired that the black portions of the picture be as black as possible, rather than somewhat grey as will be the case if the minimum beam intensity is too high.

In my above-identified U.S. Pat. No. 2,892,123, the minimum cathode-ray beam current is set by a signal clipper which removes all excursions of the brightness controlling signal extending beyond the clipping level in the direction to reduce the beam intensity. In my co-pending application Ser. No. 132,692, filed Apr. 9, 1971, the minimum beam intensity is set by the bias applied to a clipper diode in the maximum brightness circuit thereof, provided that the output of the clipper diode is applied through direct coupling to the beam-intensity controlling means of the cathode-ray tube; where there is AC coupling between the maximum brightness clipper and the beam-intensity controlling means of the cathode-ray tube, a DC restorer is utilized which, in effect, clamps or limits at a predetermined level the maximum excursion of the signal in the direction tending to cut off the cathode-ray beam.

While satisfactory for many purposes, these clipping and/or DC restoring circuits must in practice be offset somewhat from the conditions producing the minimum usable beam intensity, so as to accommodate unavoidable variations in circuit parameters. Thus the strength of the indexing signal produced can change because of line voltage variations, aging of parts of the circuit, changes of temperature of the circuit elements, etc. If the minimum beam intensity is initially set too close to the value at which the indexing signal becomes inadequate, such changes may cause it to fall below the minimum adequate level and the index signal may become inadequate for proper indexing. This can cause the reproduced image to become completely blank, or partially blank, or to contain "torn" horizontal lines. If one adjusts the minimum beam intensity so that, even when such changes in circuit conditions occur, the beam intensity will never be reduced below the minimum level required for proper indexing, then the minimum beam intensity will usually be greater than necessary, and the maximum blackness will not be as black as could otherwise have been provided, particularly when the unavoidable changes in circuit parameters occur in the direction to increase the cathode-ray beam intensity. Under such conditions, either the minimum beam intensity must be factory-set higher than would otherwise be desirable, or else the viewer will find it desirable to adjust the minimum beam intensity from time to time as conditions in the circuit change. Both of these possibilities are undesirable.

To some extent these problems can be overcome by brute-force designing using conventional techniques, such as a darker-than-conventional face plate for the cathode-ray tube, but this reduces maximum brightness, or leads to greater cost to recover the same maximum brightness; or by using an index pickup device which gathers more energy, or which has a better signal-to-noise ratio, but this too can become very expensive if carried out to a fully satisfactory extent.

Accordingly, it is an object of the invention to provide a new and useful electrical system for controlling the minimum beam intensity in an indexing type of cathode-ray tube.

Another object is to provide a system which will automatically maintain as black as possible the portions of the cathode-ray tube image intended to be black, without requiring readjustments of circuit controls by the operator.

Another object is to provide such a system which is not upset by signals generated when the scanning beam departs from the useful area containing the index elements.

A further object is to provide a timing system for controlling the horizontal blanking, and for controlling the application of a starting pedestal pulse to the beam-intensity controlling means of the cathode-ray tube at the beginning of each line, which is fully compatible with the automatic minimum beam-intensity control system referred to above.

A further object is to provide a system which maintains the desired minimum beam intensity despite variations in a large number of factors tending to influence minimum beam intensity.

A further object is to provide means which will operate effectively to properly limit maximum blackness despite variations of maximum blackness which might otherwise be caused by an automatic maximum brightness control operating to control average brightness; this objective including the more specific objective of making the present invention fully compatible with the system disclosed in my above-cited U.S. patent application Ser. No. 132,692, filed Apr. 9, 1971.

A further object is to provide, through relatively low cost, small-signal control circuits, a performance in regard to reproduction of dark areas of the reproduced image, which is comparable to that which could otherwise be reliably obtained only by relatively more costly means.

BRIEF SUMMARY OF THE INVENTION

In accordance with the invention, these and other objects are achieved by utilizing (a) signal limiting means for limiting, to a determined level, excursions of the beam-intensity controlling signal in the direction which reduces the intensity of the cathode-ray beam, (b) control means responsive to an electrical control quantity to vary said determined level and, (c) in combination therewith, means for deriving a control signal representative of the intensity of said beam and (d) means for applying said control signal to said control means to vary said limiting level in the sense to maintain the intensity of said beam above the predetermined minimum strength desired for satisfactory operation. Thus when, for any reason, the beam intensity tends to fall below an adequate level, the control signals derived will change the limiting level for the signal applied to the beam-intensity controlling means of the cathode-ray tube in the direction to increase the minimum beam intensity, thereby to assure index signal of a satisfactory strength. In this way the minimum beam intensity can be pre-set close to the level for which the index signal strength becomes inadequate, without danger that the index signal thereafter will fall below an adequate level.

Preferably the system is of the type which comprises means causing the cathode-ray beam to scan beyond the portion of the tube containing the indexing elements, together with means supplied from the source of said index signals for changing said control signal in direction determined by the direction of changes in the strength of said index signals, and in accordance with the preferred form of the invention there are provided means for sensing the times at which said beam is scanning beyond said portion of said tube and means for preventing substantial changes in said control signal in response to signals from said source occurring at such times. Such overscanning by the beam may be produced merely as a means of assuring that the entire useful image presentation area of the cathode-ray tube is utilized, but in the preferred embodiment of the invention in which each horizontal scanning line in the viewable area is preceded by one or more starting index elements, such overscanning is also provided to assure that the beam will in fact sweep over these starting elements prior to scanning of the viewing area. Unless special provision is made, once the beam leaves the useful viewing area containing the running index elements, the signal on the lead from the index source will become zero, or will comprise noise or random signals produced in response to stray light reaching the photosensitive device, for example. The invention in this form prevents such undesired signals, unrelated to the actual index signal existing during scanning of the useful viewing area, from significantly modifying the control voltage used to adjust the limiting level.

Also preferably, the preventing of such undesired changes in control signal is accomplished by providing a control-disablement means in the control path, together with means for sensing when the beam is beyond the useful viewing area and for disabling said control means at such times. The means for sensing the times at which the beam is beyond the useful viewing area preferably comprise means for producing a first signal representative of the cathode current of the cathode-ray tube, means for producing a second signal representative of the strength of said index signals, and means responsive to said first signal and to said second signal for disabling said control when said cathode current is above a predetermined level and the strength of said index signals is below a predetermined level. As soon as the latter two conditions occur simultaneously, the beam will have just left the useful scanning area containing the running indexing elements. The means for applying the control signal to the control-disabling means preferably includes a hold circuit, so that while the disabling means is in its disabled condition, the pre-existing control voltage will continue to be stored until the disabling means is no longer in its disabling condition.

Preferably also, the same means which senses that the cathode-ray beam has scanned past the end of the useful viewing area containing the running indexing elements also initiates a horizontal blanking of the beam. The beam then remains blanked until it has been deflected to the start of a new scanning line.

Means responsive to the horizontal fly-back pulse then initiates the application of a starting pedestal voltage to the beam-intensity controlling means for the cathode-ray tube, which pedestal maintains the beam intensity at a sufficient relatively fixed but uncritical level during the scanning of the first portion of the next horizontal line while at least some of the starting index elements are being scanned, thereby to ensure production of satisfactory starting index pulses. Means are also provided which sense when the starting indexing signals have performed their function of starting the index circuits at the beginning of each horizontal line, and these means enable termination of the pedestal pulse and restore the beam to the control of transmitted picture brightness and color information for the horizontal line, as modified by the automatic maximum blackness level herein described.

With this sequence of operations, not only is the minimum beam intensity maintained at the desired value automatically, but the beam is blanked as soon as it leaves the useful scanning area, remains blanked until the beginning of the next scan line, at which time the beam intensity increases to an adequate value for scanning the starting index elements, and the pedestal pulse is then terminated and the beam is returned to being controlled by picture information as the next image line is scanned, whereby the desired timing sequence and image presentation are achieved.

BRIEF DESCRIPTION OF DRAWINGS

These and other objects and features of the invention will be more readily understood from a consideration of the following detailed description taken with the accompanying drawings, in which:

FIG. 1 is an electrical schematic diagram, largely in block form, illustrating a system using the invention;

FIG. 2 is a fragmentary sectional view showing a portion of an index type of cathode-ray tube suitable for use in the system of FIG. 1;

FIG. 3 is an electrical schematic diagram, partly in block form, showing in more detail inventive portions of the system of FIG. 1;

FIGS. 4A and 4B are graphical representations to which reference will be made in describing the operation of the simultaneity gate of FIG. 3;

FIGS. 5A through 5M are timing diagrams to which reference will be made in describing the operation of various parts of the system of FIG. 3; and FIGS. 6 and 7 are electrical schematic diagrams illustrating alternative forms of the invention.

DETAILED DESCRIPTION OF SPECIFIC EMBODIMENTS

Referring now to the embodiment of the invention shown in the drawings by way of example only, FIG. 1 shows the system of the invention in broad schematic block form. In FIG. 1, the color image presentation device comprises the indexing type of cathode-ray tube 10, assumed in this example to be of the photo-indexing type, in which a plurality of adjacent triplets of red, green and blue phosphor lines are disposed adjacent each other across the front of the tube. Running index lines are provided to produce so-called "ambiguous" indexing signals indicative of beam position with respect to the phosphor lines, and starting index lines are provided for producing starting index signals.

More particularly, FIG. 2 illustrates a horizontal section through a portion of tube 10 near one edge of the front thereof. The glass front face 12 of the tube 10 is provided on its inner surface with the triplets of phosphor lines mentioned above, for example lines 13, 14, 15, which respond to beam impingement to produce red, green and blue light, respectively. A thin aluminum layer 18 covers the inner sides of the phosphor lines and extends along the interior side of the adjacent glass of the tube, around the corner thereof, and into contact with the aquadag second-anode coating 19. Running index stripes or lines such as 20, 22 extend vertically along the inner side of the layer 18 in predetermined positions with respect to the phosphor lines, preferably such that the rate at which the running index lines are scanned by the cathode-ray beam is an odd integral half-multiple of the rate at which the triplets of phosphor lines are so scanned. In this example it is assumed that these index stripes or lines are limited to the front face of the tube and that the beam scans beyond them at both the left and right sides of the image-forming area. It is also assumed herein, by way of example, that the rate of scanning of the running index lines is 3/2 times the rate of scanning of the triplets, as represented in FIG. 2. The starting index lines 28, 30 and 32 extend vertically and are positioned adjacent the left-hand margin of the portion of the tube occupied by the running index elements, and are spaced apart so as to be scanned by the cathode-ray beam at a rate which is a sub-harmonic, including 1, of the rate at which triplets of phospor lines are scanned. In this example, it is assumed that the rate of scanning the starting lines and the rate of scanning the triplets are the same.

The electrical circuits for operating the tube 10 shown in FIG. 1 are in large measure similar to those shown and described in my above-cited application Ser. No. 132,692, but with certain significant differences. More particularly, there are provided color TV receiver circuits 40 for receiving a standard color television transmission and for providing, at output terminal 42, a "Y-signal" generally representing the brightness of the television image, and for producing at output terminal 44 a chroma signal of oscillatory form generally representing the hue and saturation of the image. Circuits 40 also derive suitable timing or synchronizing signals, which are supplied over line 46 to the deflection, blanking and starting pedestal circuits 48. Circuits 48 supply the usual deflection signals over line 50 to the horizontal and vertical deflecting means 52 associated with tube 10. Preferably the deflection circuits are the type in which a so-called "fly-back" pulse is produced coincidently with the occurrence of the relatively rapid horizontal retrace of the cathode-ray beam.

The chroma signal from chroma output terminal 44 is supplied through chroma drive control 56 and chroma converter 58 to the adder circuit 60. The Y-signal is supplied through the brightness control stage 62 and coupling capacitor 64 to the adder 61; the output of adder 61 feeds into adder 60. The stage 62 and the automatic brightness control circuits for operating it may be like those described in my above-identified co-pending application Ser. No. 132,692. Accordingly, for the present purposes it is sufficient to point out that the polarity of the Y-signal at the collector of transistor 65 is such that the horizontal synchronizing and blanking pulses are directed positively, and the most positive level of signal which can pass through the automatic brightness clipper diode 66 is determined by the signal level at which diode 66 becomes non-conductive. This latter level in turn is determined by the fixed bias supplied to the anode of diode 66 by the voltage at the tap point 70 on voltage divider 72, and by the bias supplied to the emitter of the transistor 65 by the automatic brightness control circuits 74. The bias from the automatic brightness control circuits 74 varies in response to signals indicative of incipient loss of regulation of the high-voltage circuits 76 which supply the usual final-anode high voltage to the final-anode terminal 78 of tube 10, all as set forth in said co-pending application Ser. No. 132,692.

A DC restorer circuit 80 is connected between capacitor 64 and the Y-signal input to adder 61, as also described in the above-cited application Ser. No. 132,692, and consists in general of a resistor 82, connected between adder input line 68 and a positive bias source, acting together with diode rectifier 86 the anode of which is connected to line 68 and the cathode of which is returned to a voltage fixed by potentiometer 69, which is of much lower resistance than resistor 82 and sets the clamping level for the DC restorer action. Thus the most positive going portion of the Y-signal delivered to line 68 is limited to, and maintained at, a level determined by the bias on the cathode of diode 86. As described in my above-cited co-pending application Ser. No. 132,692, the bias of the cathode of diode 86 can be fixed or manually adjustable. Adjustment of the latter voltage varies the most negative value of the voltage applied to the grid of cathode-ray tube 10 by the Y-signal whenever an electric switch 90 is in the downward position shown, since the Y-signal is direct-coupled to the grid of tube 10 by way of adders 61 and 60, electronic switch 90, and an inverting amplifier stage 92.

Also shown in FIG. 1 is the photosensitive device 94 which views the photo-indexing elements within the cathode ray tube 10 to derive an ambiguous indexing signal on line 98 in response to light emitted successively by the indexing lines as they are impinged by the scanning cathode-ray beam. This signal is ambiguous in the sense that, since the three cycles of index signal produced for each two color triplets occur at different positions with respect to the phosphor lines in each of the two triplets, one cannot determine from an inspection of any given cycle of index signal which of three different positions in a triplet was being scanned when that cycle of index signal was produced. This ambiguous index signal is supplied to the index signal processing circuit 100, which operates on them to produce at its output lead 102 an unambiguous index signal at the frequency of scanning of the triplets for supply to the chroma converter 58, as desired. This signal is unambiguous in the sense that each of its cycles indicates the scanning of the same position in each triplet. This feedback arrangement of index signal causes the composite or modified chroma signal from converter 58 to be at a frequency equal to the rate of scanning of triplets by the cathode-ray beam, and it is therefore adapted properly to vary the intensity of the cathode-ray beam as the beam scans across the phosphor lines to produce the proper image color, as will be understood from my above-identified co-pending applications and from my issued patents.

In accordance with the invention herewith, the DC bias level of the signal arriving at the control grid of the cathode ray tube 10 during the useful image-forming part of the foreward scan of the tube face by the cathode-ray tube beam is determined by the DC bias level on line 84, at which times the electronic switch 90 is in its downward position. The DC level on line 84 in turn is controlled by the sum of two DC levels, corresponding to the DC levels of the two signals which feed adder 61 on lines 68 and 91. The first of these DC levels is the bias determined by the clamping level of DC restorer 80, which in turn is set to clamp the most positive going signals on line 68 (corresponding to the blackest parts of the picture) at a value determined by the setting of the brightness control potentiometer 69, which is connected to the cathode of the DC restorer diode 86, all as described in my co-pending patent application Ser. No. 132,692. The second of these DC levels is determined by the automatic maximum blackness control circuit 110, which operates in a manner hereinafter described to produce a voltage on line 91 which, in effect, allows the operator to set the image brightness up to any desired level, all the while causing the minimum brightness of the picture displayed to increase; yet, the desirable effect is also achieved that the automatic maximum blackness control circuit will override the operator setting (and the transmitter instructions) should the manual brightness control be set to such a low level of average brightness as to cause a tendency for the index signal to fall to an undesirably low level during any one part of the scan of the useful picture area.

The automatic maximum blackness control circuit 110 is preferably designed so that its output control voltage on line 91 is relatively constant despite wide ranges of change of strength of index signal as picked up by photosensitive device 94 so long as such changes are well within the range of index signal strengths great enough to ensure satisfactory indexing, and so as to change significantly its output control voltage in the event that the index signal from photosensitive device 94 tends to get close to or below a safe minimum value of index strength at which proper indexing can take place. Preferably also, the automatic blackness control circuit 110 is capable of largely ignoring any lack of index signal strength resulting from the beam of cathode ray tube 10 having scanning beyond the area occupied by running index elements. The means whereby these desirable properties of the automatic maximum blackness control circuit are achieved are described more fully later herein.

Thus, if during the scan of the useful image-forming area of the cathode-ray tube screen, the index signals strength tends to decrease below a desired level, for example as a result of transmitter instructions calling for a portion of the picture to be "too black" in terms of what the index signal processing circuits can tolerate, the automatic maximum blackness control circuit 110 provides a less positive or more negative control voltage on line 91 during the times when switch 90 is in the downward position. The less positive this latter control voltage, the more positive is the most negative voltage at the grid of the cathode ray tube 10 and the greater is the minimum beam current during the scanning of the index lines. This increase in minimum beam current then causes a corresponding increase in the strength of the index signal, thereby stabilizing the index signal strength at a suitable and adequate value despite tendencies for it to decrease. The minimum cathode-ray beam current can thereby be maintained automatically close to the level at which index signal strength would become inadequate during the blackest part of the picture, without danger that it will fall below an adequate strength, because of the automatic control arrangement just described.

While it is possible to embody the principle of the invention in very simple form to obtain a useful degree of automatic maximum blackness control, in its preferred form the invention recognizes certain other desirable attributes of such a system and provides apparatus for achieving them. While these are best understood from a consideration of the more detailed circuit shown in FIG. 3, some of the general functions and structure can be appreciated from the simplified diagram of FIG. 1. For example, one might employ for the automatic maximum blackness control circuit 110 a simple, continuously operating, peak detector or averaging circuit for deriving the desired control voltage. However, the useful index signal normally exists only while the beam is scanning the running indexing elements; once the cathode-ray beam scans beyond the portion of the tube occupied by the running index elements, the photo-sensitive device 94 will produce no output signal, or will produce random or noise output due, for example, to inherent photo-cell noise or due to light glow from the longer persistence phosphors reaching the photo-sensitive device through the thin aluminum layer 18, or due to the beam striking misplaced phosphors inadvertently present in small quantities on the side surfaces of the interior of the tube 10. Also, the index signal processing circuits may have limiters which limit on noise in the absence of a strong enough input fed to them on line 98. Accordingly, during such periods of overscan the signal produced by the photo-sensitive device 94 or its index amplifier does not represent useful indexing information annd can only have the effecct or modifying undesirably the control voltage used for the automatic maximum blackness control. For this reason it is desirable to prevent the signals produced by photo-sensitive detector 94 from reaching the automatic maximum blackness control circuit during such times of over-scanning by the cathode-ray beam.

In addition to this consideration, it is also desirable to provide certain timing signals for controlling the sequence and timing of certain operations in the system. For example, it is desirable to cut off the cathode-ray beam during over-scanning in order to avoid loss of picture contrast due to stray light which may result from impingement of the phosphors by secondary electrons created by the impingement of the cathode-ray beam upon the sides of the cathode-ray tube beyond the area occupied by the running index lines. It is also desirable to provide a fixed, substantial, pedestal voltage for increasing the beam intensity to a level relatively higher than "maximum black" during the time of scanning of the starting index lines so as to produce starting signals therefrom which contain adequately little noise, to allow rapid and correct starting by the index processing circuits at the start of each scan line. Also, the provision of this fixed pedestal voltage during start of scan involves the stripping off from the cathode-ray tube grid drive signal any transmitter picture instructions of brightness or chroma during the start of scan of index lines. In addition, it is desirable to keep the starting signal circuits open and ineffective once the beam begins to scan running index stripes since otherwise there will be interference with optimum operation.

Accordingly, still referring to FIG. 1, in the preferred embodiment there is utilized a detector-of-end-of-useful-scan-area 120, which senses when the cathode-ray beam is scanning beyond the last running index element, and the output of this detector 120 is used to prevent the automatic maximum blackness control circuit 110 from responding to signals on index suoply lead 112 at such times of overscanning.

The detector-of-end-of-useful-scan-area 120 preferably also supplies a control signal to the deflection, blanking and starting pedestal circuit 48 over lead 126 to cause electronic switch 90 to switch to its upward position in which the television transmitter instruction signals are removed from the grid of the cathode-ray tube and, instead, a beam blanking or cut-off signal is applied thereto by way of lead 127.

As will also be described more fully hereinafter, the detector-of-end-of-useful-scan-area 120 is supplied with index signal from index signal processing circuit 100 over lead 128, and is also supplied with a voltage indicator of the cathode current of cathode-ray tube 10, averaged over approximately the time required for the beam to scan a triplet of viewing phosphor lines, the latter signal being supplied by way of line 130. The latter signal on line 130 may be derived by inserting in the cathode-ray tube cathode circuit, in series between the cathode supply voltage terminal 132 and the cathode 134, an averaging circuit 138. The detector-of-end-of-useful-scan-area 120 produces an output signal only when the indexing signal supplied thereto is below a predetermined level and the cathode current sensing signal supplied thereto over line 30 is simultaneously above a predetermined level. When these two conditions occur simultaneously, it is an indication that the beam is in an overscanned position, and the detector-of-end-of-useful-scan-area 120 then prevents signals on line 112 from modifying the automatic maximum blackness control voltage and also causes the signals on line 126 to cut off the cathode-ray beam promptly, as desired.

Referring now to FIG. 3 for a more detailed description of a preferred embodiment of the invention, the preferred form for the index signal processing circuit 100, for the automatic maximum-blackness-control circuit 110, and for the detector-of-end-of-useful-scan-area 120, and the various connections thereto, are shown in more detail. Numerals corresponding to those of FIG. 2 indicate corresponding parts, except that 48a now includes only deflection circuits, the blanking and pedestal circuits being shown separately and in detail in FIG. 3.

Considering first the index signal processing circuit 100, the index signals picked up by photo-sensitve device 94 are supplied over lead 98 to a bandpass filter 200 which passes signals of frequency $3/2\, f_t$, and to filter 202, which passes signals of frequency $f_t$. (As used herein, $f_t$ is the frequency at which the color triplets are scanned by the cathode-ray beam.) Accordingly, the starting index signals produced by scanning across the starting lines such as 28, 30, 32 of FIG. 2 pass through filter 202 and amplifier 206 to a gate 208, which, when open, transfers the signals at frequency $f_t$ to the signal adder 210. The output of adder 210 supplies one input of heterodyne mixer 212.

The running index signal produced at frequency $3/2\, f_t$ by the running index lines 20, 22, etc. when they are scanned by the beam passes through filter 200, amplifier 218 and amplitude limiter 220 to the other input of mixer 212 and to one of the inputs of heterodyne mixer 222. Accordingly, at the beginning of each horizontal line scan when the starting lines are being scanned, the starting index signal of frequency $f_t$ is supplied to one input of mixer 212, and when the beam begins to scan the running index lines, a signal of frequency $3/2\, f_t$ is supplied to the other input of mixer 212. Because the time delay in the relatively narrower-band filter 202 is greater than the time delay in relatively wider-band filter 200, the two signals arriving at mixer 212 can be made to have time overlap, even though the one at $f_t$ was created in the photosensitive device prior to the time when the $3/2\, f_t$ frequency is generated therein; or if the inherent delay differential in the two channels involving paths through filters 200 and 202 is not sufficient to allow a suitable amount of time overlap, an extra delay line may be inserted in the path which lacks sufficient delay. Thus, at the time when the two signals arrive simultaneously into mixer 212, a signal at the beat frequency of $\frac{1}{2} f_t$ is produced at mixer output line 230 which is converted by frequency doubler 232 to a signal of frequency $f_t$ and supplied through adder 210 to the $f_t$ input terminal of mixer 212. The output of frequency doubler 232 is also supplied to a detector 236, the output of which sets a flip-flop 238. When flip-flop 238 is in its "set" state, it causes gate 208 to close and prevent further supply of starting index signals to mixer 212. However, mixer 212 continues to operate since its $f_t$ input is now provided by the signal from the double 232.

The index signal at $\frac{1}{2} f_t$ is also supplied over lead 240 and through capacitive-inductive delay device 242 to the second input of mixer 222. The beat frequency between the two inputs to the mixer 222 is then at the frequency $f_t$ and constitutes an unambiguous index signal of proper frequency and phase for supply to the chroma converter 58. The general operation of this index signal processing circuit is similar to that described in my above-cited issued patents.

Index signal from circuit 100 is supplied over line 510a through a resistive-capacitive coupling means 550 to line 510, which feeds one contact 243 of electronic switch means 250 in the automatic maximum blackness control control circuit 110. Coupling means 550 serves to pass the high frequency index signals, and to prevent passage of any DC components which may inadvertently appear on line 510a by action of the circuits which drive line 510a. In this example, the index signal on line 510a is taken from an output of limiter 220, although it can be taken from other places, for example from the outpuut of amplifier 218, or of frequency doubler 232, or from the output of mixer 222, so long as the place from which it is taken does not limit on noise in the absence of index optical signals arriving at photosensitive device 94.

Automatic maximum blackness control circuit 110 includes the index signal-strength detector diode 252 having its cathode permanently connected to the arm of electronic switch means 250 and its anode connected through a series resistor 254 to the variable tap 256 on the resistor 258, across the terminals of which resistor a fixed difference in potential is applied. An RF bypass capacitor 260 is connected between the anode of diode 252 and a point of fixed reference potential designated as ground. The time constant of this capacitor 260 and the circuit including resistor 254 should be sufficiently long to attenuate some of the components at index frequency, but still be short enough to allow appreciable change in voltage across the capacitor in a time corresponding to the memory time of the index processing circuits, particularly the three-halves frequency divider including the mixer 212, frequency doubler 232, and the associated frequency selective elements therein. Thus an RC time constant corresponding to the time to scan approximately two color triplets is satisfactory. The voltage across capacitor 260 is used to feed the base of transistor 267. Provided the index signal strength on line 510 is sufficient, transistor 267 is maintained in a nonconducting state whenever electronic switch 250 is in its lower position; and by virtue of a suitable negative potential shown applied to the upper contact of switch 250, the transistor 267 is also prevented from ever being driven into conduction during the time that the switch is in the upper position. However, transistor 267 will be driven into strong conduction whenever the amplitude of signal on line 520 falls below a desired level, provided switch 250 is in the lower position.

Transistor 267 has its collector returned to a source of positive potential through load resistor 266, and a storage capacitor 265 is connected between the collector of transistor 267 and a reference potential shown here as ground. While the time constant of capacitor 265 and resistor 266 may in some cases be made short compared with the time of a horizontal line scan, preferably it is made long compared with the time of a line scan, and even long compared with an entire television frame; for example, the time constant may be of the order of one-tenth second. The capacitor 265 is small enough, however, that the voltage thereacross will change very rapidly whenever transistor 267 is driven into conduction, which occurs only when the index signal is tending to fall to too low a strength. A small resistor may be inserted directly in series with the grounded terminal of capacitor 265 to allow a more rapid change of voltage at the collector of transistor 267.

The voltage developed at the collector of transistor 267 is then amplified in the non-inverting isolation amplifier 264 and applied to voltage adder 61. Normally, the factory setting of potentiometer 258, or the design of a fixed voltage divider serving in its stead, is chosen so that in the absence of index signals on line 510, the transistor 267 is driven into strong conduction, and transistor 267 stays in strong conduction for all values of index signal below a minimum safe level of indexing signal strength. Thus, if after the television receiver is first turned on, there is for some reason no cathode-ray tube beam current, and hence no index yield, then transistor 267 will go into strong conduction and thereby cause a substantial increase in cathode-ray tube beam current, up to that value which causes the index signal on line 510 to be sufficient to cause partial conduction by transistor 267 at the value of conduction which causes the feedback loop so formed to be stabilized. The time constant of discharge of capacitor 265 by transistor 267, together with the time constant of build-up of charge across condenser 260 through the diode 252, should preferably be chosen in accordance will well-known feedback criteria to achieve a stable, quick-settling feedback loop, capable of operating in less than five or ten triplets of scan. This rapid settling is typical of what is desired for action by the feedback loop in the event that index signals tend to become too weak — their strength is rapidly, almost instantaneously, corrected in a time short compared to the time to scan a full television line, preferably in a time comparable to the time of fly-wheel action of the circuits involved in the countdown operation, including mixer 212, doubler 232, and any fly-wheel action in the output circuits of limiter 220 on line 510*b*, any of which, or all of which together, may be made narrower band and hence slower acting than the relatively greater number but quicker acting elements including photosensitive device 94, filter 200, amplifier 218 and that part of limiter 220 feeding line 510*a*, plus the discharge times of capacitors 260 and 265, and the video elements 264, 61, 60, 90, 92, and 10.

However as mentioned earlier, in the event that the index signals on lines 510*a* become significantly larger than the above-described equilibrium value, as they will for brighter parts of the picture, then transistor 267 will be cut off for such parts of the picture; and, as mentioned above the charging time constant of capacitor 265 through its charging resistor 266 is preferably chosen to be several television frames in duration, so that the DC bias out of automatic maximum blackness control 110, and hence the DC bias on line 84, will be held at the value determined primarily by the index signal level, as measured by diode 252 and transistor 267, on the blackest part of the television frame, even though that blackest part is only a few picture elements in duration. Any blackness, even total blackness and beam cut-off, of duration shorter than a few picture elements will not adversely affect the indexing operation, since this duration is less than the fly-wheel action time or memory time of the frequency divider loop circuits above described.

Thus, should the index signal strength begin to fall, during even a few picture elements, indicative of incipient failure of proper operation of the index signal processing circuits, the voltage at line 84 will be driven more negative, causing the minimum cathode-ray tube beam current to increase sufficiently so as to increase the indexing signal and counteract undesired tendencies towards its decrease below a safe level. Conversely, should the minimum cathode-ray tube beam current be always greater than an amount which causes transistor 267 to be driven into conduction, the automatic circuit is very tolerant of such, and allows the transmitter and the operator to make the minimum brightness of the picture as great as they please, without their being overriden by the automatic maximum blackness circuit 110.

It is clear that, for many applications, the action of the circuit 110 is such that the need for manual control of picture brightness can be partially or completely dispensed with, by virtue of the automatic circuits herewith, since the main occasion for the manual control being set at other than blackest possible level would be when the set is to be viewed in a relatively high ambient light level. If desired, photosensitive means sensing the ambient light level can be added, to control the voltage at the cathode of diode 86 automatically, thereby even eliminating this possible need for adjustment of the brightness control.

It is also clear that the action of the circuit is such that, if the operator and transmitter instructions are calling for a very dark picture even if only in some parts of the picture, then the time constant of capacitor 265 and its charging resistor 266 will eventually (after several television frames) allow the darkest part of the picture to be continuously reduced until the point is reached where the index signal starts to be threateningly small, at which point transistor 267 will again be driven into partial conduction, to cause a stabilization at a safe value of minimum cathode-ray tube beam current.

Preferably the control voltage developed at the cathode of diode 252 is prevented from being affected by voltage variations other than those due to indexing signals produced during scanning of the running index elements. This protection is provided by the action of the electronic switch means 250, which is automatically switched to a negative potential just after the scanning of the last running index line on a given horizontal scan, and held there until the index circuits 100 are fully operating with fresh index signals from scanning the start of the next horizontal line. The manner in which these and other timing functions are preferably accomplished will now be described.

The detector-of-end-of-useful-scan-area 120 comprises simultaneity gate 400 having a pair of input terminals 402 and 404 supplied respectively with signals over leads 406 and 408, and having an output terminal 410. Simultaneity gate 400 has the property of producing an output pulse at output terminal 410 only when the signal at input terminal 404 is above a predetermined level while the signal at input terminal 402 is below a predetermined level, the selection and provision of these levels being described in detail hereinafter.

Lead 408 is connected to the cathode 134 of the cathode-ray tube 10. The cathode current averaging and limiter circuit 138 for cathode-ray tube 10 comprises, in parallel with each other, a resistor 412, a capacitor 414, a diode 413, and a series resonant trap circuit 416 made up of an inductor and capacitor in series with each other. The various components in the averaging circuit 138 are selected so that the voltage at cathode 134 represents the average of the cathode current over a time interval at least as long as the time required to scan a color triplet. Diode 413 serves to limit the voltage drop across the circuit 138 when the cathode-ray tube beam current is large (which causes diode conduction), thereby allowing the use of a higher value of resistor 412 than would otherwise be tolerable at large beam currents without disrupting cathode-ray tube performance; yet the large value of resistor 412 is desirable to permit readily the sensing of even quite small beam currents by simultaneity gate 400. Series resonant circuit 416 is series resonant at the frequency of the chroma signal, which is also the frequency $f_t$ at which the color triplets are scanned by the beam, thereby to minimize voltage variations at cathode 134 at such frequencies which would otherwise be produced when the signal at the grid of the cathode-ray tube is representing color information. Capacitor 414 is of a size, for example, to eliminate or reduce very high-frequency video frequency components, and may for example have a time-constant about equal to the time of scanning of 1 or 2 triplets.

Input lead 406 to simultaneity gate 400 is supplied with index signal by way of amplitude detector 420 and filter circuit 422. Circuit 422 consists of resistor 426 in parallel with capacitor 428, together having a time constant sufficient to average the output of detector 420 over the time of scanning of a few color triplets. The amplitude limiter 220 preferably includes several amplifying-limiter stages, and the line 440 from the limiter to the detector 420 is preferably taken from a stage preceding the last stage, at which point the gain is not sufficient to cause limiting on noise.

Referring to FIGS. 4a and 4b, FIG. 4a is a plot of the voltage $e_{406}$ at input lead 406 of the simultaneity gate, versus the amplitude of index signal voltage at input lead 442 to limiter 220. In the preferred type of limiter, not only does limiting occur at a relatively low input voltage, but in addition the limiter produces no output signal on line 510 in response to small signals having amplitudes in the range between zero and a value near that at which limiting begins. Thus, preferably the increment of input signal to limiter 220 required to drive the limiter from its non-amplifying state to its limiting state is only a few decibels. Such limiting with so-called "bottom clipping action" may be achieved, for example, by employing in the last stage of the limiter a class C amplifier stage which is biased beyond cut-off for small input signals, but which is driven into conduction rapidly when the input signal exceeds some predetermined value.

A further advantage can be realized in the design of the output stage of limiter 220. Most of the damping on the tuned circuit in the limiter output is preferably a result of a relatively low resistance of the collector of the output transistor which drives this tuned circuit. The tuned circuit should be relatively high Q when not loaded by the damping resistance of this driving transistor. When the driving transistor is cut off, due to lack of sufficient input index signal thereto, this relatively high Q circuit will continue to ring, to aid in causing the frequency counter (comprising mixer 212, doubler 232, and adder 210) to count and to emit properly phased output, despite momentary interruptions of index signal at the limiter input for several triplets duration. Care should be taken in the design of this output stage to minimize changes in phase shift therethrough of the signal applied thereto which might result from changes in input signal strength. Similar care should be taken in this regard in the design of outer stages of the amplifiers and limiters involved in the indexing circuits, to prevent color shifts due to changes of, for example, brightness, which in turn cause corresponding changes of index amplitude prior to limiting action.

Corresponding to FIG. 4A is the FIG. 4B, which shows the voltage at line 408 plotted against cathode-ray tube beam current. As is further shown by FIGS. 4a and 4b, at a small value $I_0$ of cathode current of cathode-ray tube 10, the total gain provided by the photosensitive device 94, the filter 200 and the amplifier 218 is such that strong limiting action is produced for the signal on line 440, as indicated by projecting from FIG. 4b, wherein the current value $I_0$ produces a voltage $e_0$, into FIG. 4a, wherein the voltage $e_0$, corresponding to the current $I_0$, indicates production of a limiter input voltage well to the right of the limiting threshold $e_L$. The value of $I_0$, however, is preferably very small compared with the peak cathode current of the cathode-ray tube, and the corresponding cathode-ray tube cathode voltage $e_0$ is correspondingly small, e.g. of the order of a few hundred microvolts to a millivolt.

The value of cathode current $i_c$ at which the drop across resistor 412 becomes sufficient to overcome the inherent forward voltage drop across diode 413 to cause it to be driven into conduction lies well to the right of that part of the curve shown in FIG. 4B.

Simultaneity gate 400 of FIG. 3 is constructed so as to produce an output signal at output terminal 410 when, and only when, the signal on input lead 408 exceeds the value $e_0$ and the signal at input lead 406 is well below the limiting level, e.g. the value $e_m$ in FIG. 4a. The simultaneous occurrence of these two input conditions is indicative of the fact that the cathode-ray beam has been deflected so as to no longer impinge index stripes. This arrangement provides a very substantial margin for safety in operation, since the voltage value $e_a$ is well below the value of the input to the limiter 222 which will be produced by a beam current corresponding to $I_0$, and because the value of $e_0$ is well above the value $e_{00}$ which will exist at the cathode of the cathode-ray tube when the cathode-ray beam current is sufficiently small to cause only marginal response $e_m$ from the limiter 222.

It is noted that the breaks in the abscissa axes in the graphs of FIGS. 4a and 4b are intended to show that the values to the left of the break represent the very small currents and voltages used for the above-described control purposes, while the values to the right of the breaks cover ranges which encompass values many times larger, as used to reproduce brighter portions of the image to be reproduced.

It is also noted that care should be taken to ensure that the voltage developed at the cathode of the cathode-ray tube is primarily a result of the cathode-ray beam current rather than of signals induced in the cathode lead by capacitive coupling to the intensity-controlling grid of the cathode-ray tube. Where such capacitive coupling is of significant magnitude, conventional capacitive neutralizing techniques (not shown) are preferably employed, in a manner well known in the art.

When the above-described two conditions occur simultaneously at the inputs to the simultaneity gate 400, indicating that the cathode-ray beam has scanned beyond the region occupied by the running index lines, an output signal at output terminal 410 of gate 400 is developed and applied to the "set" terminal of flip-flop 500. The resultant setting of flip-flop 500 produces an output signal at flip-flop output terminal 502 which is delivered over line 504, 504a to the switch control terminal 506 of electronic switch means 250 to actuate the latter switch to its upwardly thrown condition. In this way, the diode 252 and the capacitor 260 in the maximum blackness control circuit 110 are disconnected from the index supply line 510a and connected to a negative voltage sufficient to cut off transistor 267, so that the voltage developed across capacitor 265 and used to control maximum blackness is not affected by spurious and undesired signals which may be produced on line 510 during overscanning and retrace of the beam.

Flip-flop 500 is reset to its opposite condition, so that it throws electronic switch means 250 downward, after the beam has returned to the left margin and has scanned enough index lines to cause setting of flip-flop 238 by detector 236. Prior to this time, flip-flop 238 has been reset as follows. The horizontal fly-back pulse developed on terminal 528*a* by the deflection circuits 48A is supplied to terminal 528*b* and thence through the differentiator circuit comprising resistor 522 and capacitor 524 to produce pulses corresponding to the leading and trailing edges of the flyback pulse. It is assumed here that the flyback pulse applied to terminal 520 is of positive polarity, so that the output of the differentiator circuit during flyback is a positive pulse followed by a negative pulse. The differentiated flyback pulse is passed through a clipper diode 526 poled so as to remove the positive pulse, and the remaining negative pulse is applied to the reset terminal of flip-flop 238 to reset it. When flip-flop 238 is set shortly after the beginning of the scanning time, the resultant signal at the output terminal 528 of flip-flop 238 is applied over lead 536 to the reset terminal of flip-flop 500, causing it to reset. Accordingly, electronic switch means 250 is thereupon repositioned to its lower position. The above-described resetting of flip-flop 238 also renders gate 208 transmissive, permitting it to pass the starting index signals when the beam begins to scan across the starting lines at the beginning of the next horizontal line, so that the operation previously described can be repeated for the next horizontal line.

If for some reason (such as because the width of horizontal scan is inadvertently adjusted to be so small that the CRT beam does not scan fully to the right side of the CRT screen and beyond the running index stripes prior to start of retrace) there does not appear an output from the simultaneity gate when required, to insure reliable operation none-the-less under such adverse circumstances, diode 571 is preferably employed, and used to pass a trigger pulse to the "set" terminal of flip-flop 500 at the start of horizontal fly-back. Diode 571 receives its signal from point 524*a* which, as was explained above herein, has a positive pulse thereon at the start of horizontal beam retrace, and diode 571 is poled in the proper direction to pass this pulse but not to conduct when a negative pulse later appears on terminal 524*a*.

The use of the above-described alternative "set" circuit including diode 571 has the further advantages of (a) allowing a greater tolerance to be built into the simultaneity gate 400, which can now be designed so as to be effective only on levels corresponding to relatively bright parts of the overscanned portion of the picture, since only for such relatively bright parts will it be useful to reduce the beam intensity to prevent loss of picture contrast due to secondary electrons bouncing off the funnel of the CRT when the funnel is struck by the overscanned, otherwise-unblanked, beam; or alternatively, (b) allowing dispensing entirely with the simultaneity gate 400 and the circuits which feed it. In the event of design of the TV receiver using this latter alternative (b), there may be a loss of contrast due to overscanning to the right with bright portions of the transmitted scene off the screen; but in most entertainment receivers this will still prove commercially acceptable, since the scattered secondary electrons from overscanning will usually be hitting a part of the viewing phosphor which is also brightly lit from other parts of the same bright scene.

The outputs from flip-flop 500 produced when it is set and reset are also supplied to the switch control terminal 600 of the electronic switch means 90, to cause the latter switch means to change to the opposite condition from that shown when flip-flop 500 is set and to return to the condition shown when flip-flop 500 is reset. Accordingly, as soon as the simultaneity gate 400 indicates that the cathode-ray beam has scanned horizontally beyond the running index elements, or as soon as diode 571 produces a pulse indicating that the horizontal sweep has completed its forwarded motion and has started its return trace, electronic switch means 90 disconnects the composite color television image from the intensity-controlling grid of the cathode-ray tube 10, and instead connects the grid to the source of blanking and pedestal voltage (line 542), produced by the output of flip-flop 238, as adjustably biased through resistor 540, thereby assuring that the beam will be turned off promptly by the blanking voltage before it can produce stray random light by striking portions of the cathode-ray tube beyond the useful viewing area, which light otherwise could produce a reduction in the apparent contrast of the television image.

Resetting of flip-flop 238 preferably also initiates the pedestal used to maintain the cathode-ray beam intensity at a fixed predetermined substantial level during scanning of the starting lines. To this end, the output of flip-flop 238 is supplied through the adjustable resistor 540 and over line 542 to the terminal 544 of electronic switch means 90. Also, a variable potentiometer arrangement 550 supplies an adjustable direct voltage through series resistor 552 to the contact 544 of electronic switch means 90, thereby to provide the desired value for the above-described blanking voltage which accomplishes the desired cutting-off of the beam promptly after the beam scans past the running index lines and switch 90 is thereby actuated to the position opposite to that shown.

In the over-all operation of the system then, during the normal scanning of a given horizontal line the electronic switch means 250 and 90 will be in the positions shown so that the composite color television signal is applied to the intensity-controlling grid of the cathode-ray tube 10 and the running index lines produce an index signal which is applied over line 510*a* to the automatic maximum brightness control circuit 110 to sense the strength of the index signal and produce a control voltage for varying the DC component of the cathode-ray tube grid voltage, thus automatically adjusting the minimum cathode-ray tube current, and hence the maximum blackness of the reproduced image, when any of many different conditions in the circuit vary so as to tend to reduce the strength of the index signal below a usefully satisfactory value during any portion of the scan of the picture past running index lines on the face of the cathode-ray tube. The adjustable bias produced on the anode of diode 252 by potentiometer 258 is preferably set so as to cause a tendency for the picture to be so black in its blackest portions that the index signal would be too weak for proper indexing, in the hypothetical absence of the control voltage coming over line 510*a*. With this adjustment, the closed loop operations of the automatic control described herein will correct the tendency for too weak a minimum beam current, and insure a proper minimum value of just sufficient index at all times to insure proper operation of the index circuits.

When the beam scans past the useful viewing area of the cathode-ray tube, so that the running index lines are no longer impinged, this condition is sensed by the end-of-useful-scan detector 120, and electronic switch means 250 is operated to isolate the automatic maximum blackness control circuits from the index line 510a and supply them with a fixed holding voltage until the flip-flop 500 is reset by the occurrence of index signals during the next line scanning, which in turn are detected in detector 236; which in turn sets flip-flop 238, the output of which flip-flop resets flip-flop 500, whereupon the signal on line 504 resets electronic switch means 250 to its lower position, as shown in FIG. 3.

Also, when the beam begins to scan beyond the useful area containing the running indexing elements, the operation of the flip-flop 500 causes switch means 90 to disconnect the composite television signal from the intensity-controlling grid of the cathode-ray tube 10 and to replace it with a blanking voltage which cuts off the cathode-ray beam. When flip-flop 238 is reset by the occurrence of the end of the horizontal fly-back pulse, the latter blanking voltage is automatically replaced by a pedestal pulse to maintain the beam intensity at a satisfactory fixed level during the scanning of the starting lines.

As mentioned above, once the running indexing lines take over the operation of the mixers in the index signal processing circuit, the detector 236 sets the flip-flop 238, thereby terminating the pedestal pulse and opening the starting signal gate 208 so as to permit repetition of the just-described operation during the next horizontal line scanning.

Reference is now made to the timing diagram comprising FIGS. 5A through 5M, which are plotted to a common horizontal time axis but which are illustrative only and not to scale, nor accurately depictive of the details of the actual wave shapes. FIG. 5A represents a received brightness signal such as may appear at terminal 42 in FIG. 1 comprising the periodically-recurrent, vertically-extending, generally-rectangular synchronizing pulses, one per horizontal line scan. Each of these pulses is shown for clarity as being followed immediately by a small burst of color subcarrier, after which the signal departs from the transmitted black level and contains brightness-representing variations depicting the brightness of the image to be formed on the cathode-ray tube. Actually, the subcarrier burst will generally have frequency components which lie above the highest video frequency which is passed by the Y-circuit channels, and therefore such a carrier burst, which may be present in the internal parts of the color TV receiver circuits 40, will generally not be present on terminal 42, but the showing in FIG. 5A of this burst is for clarity in understanding of the timing depicted in the rest of the timing waveforms.

The total time interval represented in FIGS. 5A through 5M is a little more than the time of one horizontal line scanning, and the break in the center of each of the graphs indicates that the central portion of each line scan has been omitted, and the time scale interrupted and compressed in that range, for convenience in exposition.

FIG. 5B depicts the horizontal beam position during scanning, the right-most extreme of the beam position being at the lower limit of the graph and the left-most position being at the extreme top of the graph. As shown, during the normal horizontal blanking interval of the received signal the beam returns rapidly from the right side to the left side of the image, and then proceeds more slowly and substantially linearly to the right extreme.

FIG. 5C shows the horizontal flyback pulse occurring at terminal 528b, and FIG. 5D illustrates the corresponding reset pulse at 528c produced by the railing edge of the flyback pulse after differentiating and clipping.

FIG. 5E illustrates the state of flip-flop 238, showing that reset thereof occurs promptly in response to the reset pulse of FIG. 5D. Reset of 238 renders the gate 208 transmissive to pass starting pulses at the beginning of each line, and produces the concurrent negative starting pedestal on lead 542 as shown in FIG. 5K.

Under these conditions, the starting signal shown in FIG. 5F passes through gate 208 as the starting stripes are scanned during the pedestal pulse; due to the differential delay in filters 200 and 202, the ambiguous index signal on line 442 begins to build up, at least partially concurrently with the starting signal as shown at FIG. 5G, at which time the output from detector 236, shown in FIG. 5H, quickly builds up to a level sufficient to set flip-flop 238, as shown in FIG. 5E. This setting of flip-flop 238 renders starting signal gate 208 non-transmissive to prevent the passage of interfering signals after the starting interval, and terminates the pedestal pulse of FIG. 5K by reducing (increasing the positive value of) the signal on line 542.

During the initial portions of the line scanning just described, the electronic switches 90 and 250 are in their "up" states, opposite to the positions shown in FIG. 3, whereby chroma and brightness signals are disconnected from the grid of the cathode-ray tube 10 and instead the latter grid is provided with the signals representative of blanking and pedestal voltages; and whereby the automatic maximum blackness control ciruit is disconnected from the source of indexing signals and instead is connected to a negative holding voltage which holds transistor 267 turned off during this time. However when, as described above, the flip-flop 238 is returned to its set condition by detector 236, the output of flip-flop 238 acts over line 536 to reset flip-flop 500, causing in turn switches 90 and 250 to return to their "down" positions shown in FIG. 3, whereby the grid of the cathode ray tube is thereafter supplied with brightness and chroma signals for forming the color image and the automatic maximum brightness control circuit is supplied with unambiguous indexing signals over line 510 to resume its sensing and control functions.

The image-forming signals are then continuously applied to the cathode-ray tube grid, and running index signals are generated during the normal scanning of the useful viewing area of the cathode-ray tube until, as represented at $T_L$ of FIG. 5G, the beam scans past the last running index line and the index signal on line 442 rapidly decays to a small, and then a zero, value. When this occurs, the output of detector 420 as applied to input terminal 402 of the simultaneity gate 400 rapidly decreases and $e_{406}$ becomes less than $e_m$ of FIG. 4A while $e_{408}$ remains greater than $e_0$ due to the continuance of cathode current in the cathode-ray tube, with the result that simultaneity gate 400 produces the output shown in FIG. 5L. When this latter output rises to a value sufficient to set the flip-flop 500, switches 90 and 250 are rapidly returned to their "up" conditions in preparation for repetition of the complete procedure during the next horizontal line scanning. Because the beam is thereby blanked, the simultaneity gate output of FIG. 5L disappears.

In the case in which the horizontal scan does not extend rightward past the last running index line, whether by design or by some infrequently-occurring circumstance (for example to short a horizontal scan or a positioning of the entire raster too far to the left), then the time $T_2$ of the flyback pulse (FIG. 5C) may occur before the time $T_L$ (FIG. 5G), rather than after as is shown for the sequence of events depicted in FIG. 5G. In this event, the flyback pulse will reach a value at this earlier time $T_2$ (earlier than the time when flip-flop 500 would otherwise have been set by the pulse of FIG. 5L from simultaneity gate 400) of sufficient magnitude to set the flip-flop 500 at time $T_2$ rather than at the time of the pulse of FIG. 5L, which occurs subsequent to $T_L$.

FIG. 5M illustrates the general nature of the signal actually reaching the cathode-ray tube grid. It will be seen that it comprises an initial relatively positive pedestal pulse, corresponding to the negative pedestal pulse of FIG. 5K, when then disappears and is replaced by a composite color-image representing signal made up of a brightness component shown in broken line plus a substantially sinusoidal component occurring at the triplet scanning rate and representing the chroma information. This continues until the flip-flop 500 is set by the simultaneity gate 400, at which time a blanking level of voltage is applied to the cathode-ray tube grid until the next succeeding pedestal pulse occurs due to resetting of flip-flop 238.

It is noted that the sinusoidal chroma component of the signal at the cathode-ray tube grid may at times, depending upon the picture component, momentarily reduce the beam intensity to a very low value or even extinguish it entirely during a given half-cycle of the sinusoidal signal. Since there are more than one index lines per color triplet, this does not interfere with the generation of the desired index signal. However, it is for this reason that the control signal which automatically controls the maximum blackness is made to respond to an average of the running index signal over at least one or several color triplets rather than to respond to the instantaneous minimum value of the index signal, since the index signal from any given one running index line may instantaneously be extremely low, or zero, even though the general level of brightness and index strength is adequate.

While in the embodiment shown the control of maximum blackness, or minimum beam current, is effected by combining a variable DC control voltage with the signal applied to the beam-intensity control means of the cathode-ray tube, this control may instead be exerted by adding the variable DC control voltage from amplifier 264 to other parts of the video chain, for example by adding it to the bias voltage at the cathode of the DC restorer diode 86 to vary the clamping level and hence the DC level of the signal delivered to the cathode-ray tube grid.

FIG. 6 illustrates a variant of the system shown in FIG. 3, according to which the automatic blackness control circuit 110 is supplied with input signal not from the index signal processing circuit 100 but instead from the cathode 134 of the cathode-ray tube 10. Accordingly, all of the elements of FIG. 6 are the same as in FIG. 3, and are numbered in the same manner except for the addition of the phase inverting amplifier 800 connected between the cathode 134 and the signal input supply line to contact 243 of electronic switch 250, together with a DC level adjusting bias source 802 for providing the amplifier with a suitable input bias level. As in the case of the FIG. 3 embodiment, should the minimum cathode current of the cathode-ray tube become smaller than desired it will operate the automatic maximum blackness control circuit to increase the minimum cathode current or prevent it from decreasing further.

FIG. 7 illustrates a variant of the embodiment of FIG. 3, in which the amplifier 218 comprises a variable gain amplifier 218A. The gain of amplifier 218A is momentarily reduced automatically during reception of the starting index signals from photo-sensitive device 94, the gain of amplifier 218A however being at a high level during scanning of the running index lines. In this example the appropriately timed gain controlling signal is supplied to the gain control terminal 810 of the variable gain amplifier from the output of detector 236, by way of line 812. During the time that the beam is undergoing retrace and performing initial scanning of starting index lines there will be no output from detector 236 and the gain of amplifier 218A will be low; thereafter, when the starting index stripes have caused the frequency counting operation for the index signal to begin, and during the subsequent scanning of the running index lines, there will be an output from detector 236 which operates amplifier 218A at full gain.

This allows the counter circuits to operate even on very small index signals from photo-sensitive device 94 during the useful portion of the scanning operation during which the color image is produced, but prevents limiter 220 from limiting on electrical noise after the end of each horizontal scanning line, during retrace, during the start of forward scanning, and during the generation of the first starting index signal, thereby preventing noise inputs from causing possible misphasing of the frequency counter operation in the index processing circuits 100 while at the same time permitting the system to operate properly on even small running index signals.

It will be understood that the gain control signal for amplifier 218A may be taken from other points in the system where appropriately timed signals exist.

While the invention has been described with particular reference to specific embodiments thereof in the interest of complete definiteness, it will be understood that it may be embodied in a variety of forms diverse from those specifically shown and described without departing from the spirit and scope of the invention as defined by the appended claims.

What is claimed is:

1. In an image-display system comprising a cathode-ray tube and means for repeatedly scanning the beam of said tube back and forth over an image-display area therein in a line-by-line fashion, each line-scanning cycle being divisible into several time intervals, said tube having beam-intensity controlling means responsive to an input signal containing information to be displayed to produce an image in said area during forward scans of said beam, said tube comprising index elements dispersed through said area to produce ambiguous index signals in response to the scanning by said beam which ambiguously represent the position of said beam, said tube also comprising ambiguity-resolving means impinged by said beam during said scanning for producing ambiguity-resolving signals containing information enabling resolution of the ambiguity of said ambiguous index signals; first index circuits for processing said ambiguous index signals; second index circuits for processing said ambiguity-resolving signals; and third index circuits responsive to said first and second index signals for generating an unambiguous index signal:

means for modulating said beam current, during a first time interval including at least a portion of the time of forward scanning of said ambiguity-resolving means, with a waveform appropriate to assure an adequate level and duration of said ambiguity-resolving signals, thereby to assure proper initiation of generation of said unambiguous index signal;

means for initiating control of said beam-intensity by said input signal, after the termination of said first time interval, and for maintaining said beam control throughout a second time interval beginning after said first time interval, thereby to produce said image;

automatic control means operative during said second time interval for shifting the D.C. level of said input signal to further control said beam intensity, and responsive during said second time interval to the occurrence of tendencies for portions of said image area to become so dark as to interfere with proper production of said unambiguous signals, thereby to reduce said tendencies; and means for turning off said beam during a third time interval starting approximately at the end of said second time interval.

2. Apparatus in accordance with claim 1, in which said third time interval ends approximately upon the ending of the backward scanning of the beam.

3. Apparatus in accordance with claim 2, in which said first time interval starts no earlier than the end of said third time interval.

4. In an electronic image-display system of the class employing an image-display device responsive to an image-representing light-control signal derived from input signals for producing a viewable image in a predetermined image area of said device by controlled sequential actuation of successive portions of said image area by a scanning entity and having running index elements dispersed at specific locations in said image area for producing an index signal indicative of the times of actuation of said successive portions by said scanning entity, said index signal varying in strength in response to variations in the strength of said light-control signal and having a tendency under some conditions to fall below a predetermined minimum acceptable level:

means responsive to said scanning entity for producing an index signal-strength monitoring signal which varies with said index signal strength during said scanning of said image area;

first means for sensing said monitoring signal selectively when darker portions of said image are being actuated and for producing a control signal therefrom representative of the strength of said index signal during said actuation of said darker image portions; and second means responsive to said control signal for shifting the D.C. level of said light-control signal to oppose tendencies for said index signal strength to fall below said minimum acceptable level during said actuation of said darker portions of said image;

said light-control signal comprising recurrent first signal intervals during which it produces a visual image, and recurrent second signal intervals during which it is non-representative of said visual image, and in which said sensing means is responsive to said monitoring signal during at least a portion of said first signal intervals;

said image-display device comprising a cathode-ray tube having screen means scanned horizontally by the cathode-ray beam in the pattern of a television raster, said beam overscanning beyond said index elements in the latter portions of most of said first signal intervals, said apparatus comprising means for sensing the beginning of each of said overscannings and for initiating blanking of said beam at such times.

5. Apparatus in accordance with claim 4, comprising means for terminating said blanking after the end of each of said horizontal line scannings.

6. Apparatus in accordance with claim 4, comprising means to terminate blanking of said beam after it has completed the horizontal retrace portion of its scan.

7. Apparatus in accordance with claim 4, comprising means for preventing said input signals from significantly modulating the intensity of the beam during said blanking interval, and subsequent thereto until after the next start of forward scan of said index elements.

8. Apparatus in accordance with claim 4, comprising means for providing a signal to modulate momentarily the beam intensity to a relatively fixed value during those time intervals starting approximately after horizontal retrace and lasting at least until the start of forward scan of said index elements.

9. In a television display system of the index type employing a cathode-ray tube comprising screen means having an image-forming area responsive to scanning by the beam of said tube to form a viewable image thereon and running index means positioned so as to be impinged sequentially by said beam as it scans said image-forming area of said screen means for producing an index signal representative of the position of said beam as it scans said image-forming area, and means responsive to an image-controlling signal for controlling the intensity of said beam as it scans said area to form said image whereby the strength of said beam tends at times to decrease below a level for which said index signal is of adequate strength:

automatic minimum beam-current control means for controlling the minimum average value of current in said beam during said scanning of said image-forming area, averaged over a selected interval occurring during said scanning by said beam while it is producing said image, said interval being short compared with the time of one complete scanning of said image, said control means comprising: sensing means selectively responsive to decreases in the level of said index signal below a predetermined level during said forming of said image in said image-forming area for generating a control signal, said control signal persisting for a period long compared with said selected interval; and means for controlling the value of said beam current in response to said control signal.

10. The apparatus of claim 9, in which said image-forming area contains groups of elements emitting light of different colors in response to impingement by said beam to form said image, said beam scans said groups sequentially in line-by-line fashion, said selected time interval is short compared with the time of scanning of one of said lines and said control signal produced by each of said decreases is initiated in a time short compared with the time for a complete scanning of said image by said beam but persists for a time at least as long as said time to scan a complete image.

11. In an image-display system comprising a cathode-ray tube and means for repeatedly scanning the beam of said tube back and forth over an image-display area therein in a line-by-line fashion, each line-scanning cycle being divisible into several time intervals, said tube having beam-intensity controlling means responsive to an input signal containing information to be displayed to produce an image in said area during forward scans of said beam, said tube comprising index elements dispersed through said area to produce ambiguous index signals in response to the scanning by said beam which ambiguously represent the position of said beam, said tube also comprising ambiguity-resolving means impinged by said beam during said scanning for producing ambiguity-resolving signals containing information enabling resolution of the ambiguity of said ambiguous index signals; first index circuits for processing said ambiguous index signals; second index circuits for processing said ambiguity-resolving signals, and third index circuits responsive to said first and second index signals for generating an unambiguous index signal:

means for modulating said beam current, during a first time interval including at least a portion of the time of forward scanning of said ambiguity-resolving means, with a waveform appropriate to assure an adequate level and duration of said ambiguity-resolving signals, thereby to assure proper initiation of generation of said unambiguous index signal;

means for initiating control of said beam-intensity by said input signal, after the termination of said first time interval, and for maintaining said beam control throughout a second time interval beginning after said first time interval, thereby to produce said image;

automatic control means operative during said second time interval for shifting the D.C. level of said input signal to further control said beam intensity, and responsive during said second time interval to the occurrence of tendencies for portions of said image area to become so dark as to interfere with proper production of said unambiguous signals, thereby to reduce said tendencies; said second time interval ending approximately upon the cessation of forward scanning of the said index elements along said line; and means for terminating the responsiveness of said control means to the occurrence of said tendencies, after said second time interval.

12. In a television display system of the indexing type employing a cathode-ray tube comprising screen means having an image-forming area responsive to scanning by the beam of said tube to form a viewable image thereon and running index elements positioned with respect to said image-forming area of said screen means to produce an index signal in response to impingement by said scanning beam and representative of the position of the scanning beam as it scans said image-forming area of said screen means:

automatic minimum beam-current control means for controlling the minimum average value of current in said beam, averaged over a selected interval occurring during said scanning by said beam while it is producing said image, said interval being short compared with the time of one complete scanning of said image, said control means comprising sensing means selectively responsive to decreases in said minimum average value below a predetermined level during said forming of said image in said image-forming area for generating a control signal persisting for a period long compared with said selected interval, and means for controlling the value of said beam current in response to said control signal, said sensing means comprising amplitude-responsive means for detecting variations in the amplitude of said index signal.

13. A system in accordance with claim 12, in which said means for generating a control signal comprises: quantity storage means and quantity changing means connected thereto to form a time-constant circuit having a time-constant long compared with said interval, and quantity transfer means responsive to said detected variations for relatively rapidly altering, in a time short compared with said time constant, the quantity stored by said storage means when said decreases in minimum average value occur.

14. In an index type of image-presentation system comprising a cathode-ray tube having an image-presentation area scanned by the beam of said tube and responsive to image-representing signals applied to a beam-intensity controlling element thereof to produce an image extending through said area said tube having index elements dispersed through said area in alignment with different portions of said area which respond to impingement by said scanning cathode-ray beam to produce index signals representative of beam position in said area and of a level which decreases with decreases in the current of said beam impinging said index elements:

apparatus for preventing said index signals from falling substantially below a predetermined level, at least during certain time intervals, comprising means responsive to decreases of said index signals to said level during producing of said image for increasing said beam current.

15. In an indexing type of television image presentation system comprising a cathode-ray tube having an image-presentation area containing a plurality of similar groups of stripes emissive of light of different characteristics in response to impingement by the cathode-ray beam of said tube and containing index elements in alignment with said groups, said index elements responding to impingement by said beam to produce index signals indicative of the position of said beam, said index signals having a level which increases with increases of the current in said beam impinging said index elements, and said light-emissive stripes producing an intensity of light which also increases with the current of said beam impinging them, said tube comprising beam-intensity controlling means responsive to image representing signals applied thereto to vary the current in said beam and thereby form an image extending through said area while also causing said index signals to vary in strength:

apparatus for establishing a minimum level of said index signals at least during certain time intervals, comprising control circuit means responsive to said index signals during forming of said image for producing a control signal and for applying said control signal to a beam-intensity controlling element of said tube to increase said beam current in response to a decrease in the amplitude of said index signals in the region of said level.

16. In an index type of color television image-presentation system comprising: a color television cathode-ray tube having an image-presentation screen made up of triplets of generally vertically-extending stripes of phosphors and generally vertically-extending index stripes spaced across said screen in predetermined geometric relation to said phosphor stripes, different phosphor stripes in each group responding to impingement by the cathode-ray beam of said tube to produce light of different colors, said tube also comprising beam-intensity controlling means responsive to color-television image representing signals applied thereto to vary the intensity of said beam as it is scanned across said screen to reproduce a color image throughout a viewing area thereof, said index stripes being responsive to impingement by said scanning beam to produce an index signal; said system also comprising index signal processing circuits supplied with said index signal from said tube, said index signal processing circuits being characterized by a predetermined minimum amplitude of said index signal supplied thereto for which reliable operation of said index signal processing circuits will occur:

the improvement comprising means for selectively detecting a decrease in the amplitude of said index signals toward said minimum amplitude during a portion of the scanning of said image-containing viewing area by said beam and for applying a control signal to said beam-intensity controlling means to shift the D.C. level of said image-representing signals to increase the intensity of said beam in response to said decrease.

17. In a color television image-display system of the index type, comprising: a cathode-ray tube having an image-forming screen apparatus containing a plurality of similar groups of elemental areas, different areas in each group being responsive to impingement by the cathode-ray beam of said tube to produce light of a different color, and a plurality of index elements in predetermined geometric relation to said groups and responsive to impingement by said beam to produce index signals; means for scanning said beam across said groups of elemental areas; means for varying the intensity of said beam during said scanning in response to an image-control signal to form a color image on said screen apparatus and to produce index signals from said index elements representative of the position of said beam with respect to said groups during said scanning; and means responsive to said index signals for modifying said image-control signal to cause it to vary in proper time-relation to said scanning of said elemental areas so long as said index signals are of greater than a predetermined minimum level; the improvement comprising:

means responsive to decreases toward a predetermined value of said index signals occurring during said image-forming, averaged over at least the time of scanning of one of said groups of elemental areas, for increasing the average intensity of said beam during subsequent scanning of said groups thereby to reduce tendencies of said index signal to fall below said minimum level.

18. In an image-display system comprising a cathode-ray tube and means repeatedly scanning the beam of said tube back and forth over an image-display area therein in a line-by-line fashion, each line-scanning cycle being divisible into several time intervals, said tube having beam-intensity controlling means responsive to an input signal containing information to be displayed to produce an image in said area during forward scans of said beam, said tube comprising index elements dispersed through said area to produce ambiguous index signals in response to the scanning by said beam which ambiguously represent the position of said beam, said tube also comprising ambiguity-resolving means impinged by said beam during said scanning for producing ambiguity-resolving signals containing information enabling resolution of the ambiguity of said ambiguous index signal; first index circuits for processing said ambiguous index signals; second index circuits for processing said ambiguity-resolving signals; and third index circuits responsive to said first and second index signals for generating an unambiguous index signal:

means for modulating said beam current, during a first time interval including at least a portion of the time of forward scanning of said ambiguity-resolving means, with a waveform appropriate to assure an adequate level and duration of said ambiguity-resolving signals, thereby to assure proper initiation of generation of said unambiguous index signal;

means for initiating control of said beam-intensity by said input signal, after the termination of said first time interval, and for maintaining said beam control throughout a second time interval beginning after said first time interval, thereby to produce said image;

automatic control means operative during said second time interval for shifting the D.C. level of said input signal to further control said beam intensity, and responsive during said second time interval to the occurrence of tendencies for portions of said image area to become so dark as to interfere with proper production of said unambiguous signals, thereby to reduce said tendencies; said second time interval ending approximately upon the cessation of forward scanning of the said index elements along said line; and means for terminating the operation of said automatic control means at approximately the end of said second interval.

19. In a color television image display system, comprising: a source of signals representing primarily the brightness of an image to be displayed; a source of signals representing primarily the chroma of said image; a cathode-ray tube comprising image-forming screen means including groups of elemental areas each area of each said groups being responsive to impingement by the cathode-ray beam of said tube to produce light of a different color; means for scanning said beam repetitively across said screen means according to the pattern of a television raster; means responsive to an applied color television signal for controlling the intensity of said beam to form a color television image thereon during forward scannings of said beam from one side of said screen means to the other, and responsive to horizontal and vertical blanking pulses to blank said beam during retraces of said beam; a plurality of running index elements spaced across said screen means in predetermined geometric relation to said groups of elemental areas so as to be impinged successively by said beam during said forward scanning to produce ambiguous index signals representative of the position of said beam; at least one starting index element positioned adjacent the edge of said one side of said screen means to be impinged by said beam prior to each of said forward scannings to produce a starting index signal; index signal processing circuits responsive to said starting index signal and said ambiguous index signals for producing unambiguous index signals therefrom during each of said forward scannings; means responsive to said unambiguous index signals and to said chroma signals for producing modified chroma signals for producing modified chroma signals varying at a rate substantially equal to the rate at which said beam is scanning said groups of elemental areas; the improvement according to which:

said forward scannings of said beam extend beyond the last of said running index elements at said other side of said screen means, and said system comprises means for generating end-of-scan signals representative of the times at which said forward scannings extend beyond said last of said running index elements and means responsive to said end-of-scan signals to initiate application to said beam-intensity controlling means of beam-blanking signals.

20. In a system according to claim 19, means for producing retrace signals indicative of the times at which said beam has returned to said one side of said screen means after each of said forward scans, and means responsive to said retrace signals for increasing the intensity of said beam to a predetermined pedestal level during scanning of said at least one starting index element.

21. In a system according to claim 20, means responsive to generation of said unambiguous signals during each of said forward scannings to terminate said pedestal level of beam intensity.

22. In a system according to claim 21, means responsive to said generation of said unambiguous signals for applying said modified chroma signals and said brightness representing signals to said beam-intensity controlling means, and means for preventing said applying thereof during at least a portion of the times of occurrence of said pedestal level of beam intensity.

23. In an image-presentation system of the class comprising an indexing type of cathode-ray tube structure in which indexing elements are positioned within a cathode-ray tube; means for scanning the cathode-ray beam of said tube cyclically across said indexing elements to produce beam-position indicating index signals of a satisfactory predetermined minimum strength when said indexing elements are impinged by the beam of said tube with a predetermined minimum intensity as said beam scans across said indexing elements; means responsive to said index signals and to received image-representing signals for developing a beam-intensity controlling signal; means for applying said beam-intensity controlling signal to said tube to control the intensity of said beam in a manner to effect reproduction of an image on said tube; signal limiting means for limiting, to a predetermined level, excursions of said beam-intensity controlling signal in the sense which reduces said beam intensity:

control means responsive to an electrical control quantity to vary said predetermined level of limiting;

means responsive to said index signals for deriving, during reproducing of said image, a control signal representative of the strength of said index signal; and means for applying said control signal to said control means to vary said limiting level in the sense to maintain the strength of said index signals above said predetermined minimum strength.

24. In an image-presentation system of the class comprising an indexing type of cathode-ray tube structure in which indexing elements are positioned within a cathode-ray tube; means for scanning the cathode-ray beam of said tube cyclically across said indexing elements to produce beam-position indicating index signals of a satisfactory predetermined minimum strength when said indexing elements are impinged by the beam of said tube with a predetermined minimum intensity as said beam scans across said indexing elements; means responsive to said index signals and to received image-representing signals for developing a beam-intensity controlling signal; means for applying said beam-intensity controlling signal to said tube to control the intensity of said beam in a manner to effect reproduction of an image on said tube; signal limiting means for limiting, to a predetermined level, excursions of said beam-intensity controlling signal in the sense which reduces said beam intensity:

control means responsive to an electrical control quantity to vary said predetermined level of limiting;

means for deriving, during reproducing of said image, a control signal representative of the strength of said index signal;

means for applying said control signal to said control means to vary said limiting level in the sense to maintain the strength of said index signals above said predetermined minimum strength;

means responsive to said index signals for changing said control signal in a sense determined by the sense of changes in the strength of said index signals;

means for scanning said beam beyond the portion of said tube containing said index elements;

means for sensing the times at which said beam is scanning beyond said portion of said tube; and means for preventing substantial changes in said control signal in response to changes in said index signals at said last-named times.

25. The system of claim 24, in which said means for preventing changes in said control signal comprises electrically-controlled switch means for rendering said means for applying said control signal to said control means ineffective at said times.

26. The system of claim 25, in which said means for sensing times at which said beam is scanning beyond the area occupied by said indexing elements comprises:

means for producing a first signal representative of the beam current in said tube;

means for producing a second signal representative of the strength of said index signals; and means responsive to said first signal and to said second signal for actuating said switch means when said cathode current is above a predetermined level and the strength of said index signals is below a predetermined level.

27. The system of claim 26, comprising means for initiating horizontal blanking of said beam when said switch means is actuated.

28. The system of claim 27, in which said means for scanning said beam comprises means for producing a horizontal fly-back pulse, said system comprising means responsive to the trailing edge of each of said fly-back pulses for initiating application of a pedestal pulse to said beam-intensity controlling means to maintain the intensity of said beam at a predetermined substantial level for an interval of appropriately controlled duration occurring just prior to each horizontal scanning of said tube.

29. In an electronic image-display system of the class employing an image-display devide having an image-forming area, running index elements dispersed through said area, one or more index elements adjacent one margin of said area used for starting, and means for repetitively scanning said one or more starting index elements and said running index elements in sequence during each scan, thereby to produce a starting index signal and then an ambiguous running index signal during each scan; signal transfer means for passing said ambiguous running index signal; counter means initially responsive to said starting index signal and thereafter responsive to said transferred running signal to produce an unambiguous index signal during each of said scans; and means for reducing the gain of said transfer means momentarily during each said scan of said one or more index elements used for starting, and for returning said gain to a relatively higher value during the remaining portion of said each scan while said running index elements are being scanned.

30. The system of claim 29, in which said transfer means comprises amplitude limiting means.

31. The system of claim 30, in which said amplitude-limiting means comprises a bottom-clipping limiter.

32. The system of claim 29, in which said gain-reducing means comprises means responsive to the occurrence of said starting index signal for controlling the gain of said transfer means.

33. The system of claim 29, in which said gain reducing means comprises means responsive to a signal produced by said counter means to control the gain of said transfer means.

34. In an index type of televison display system comprising a cathode-ray tube containing an image area which includes index elements therein for producing index signals indicative of the cathode-ray beam location in said image area, said system being responsive to an input video signal to control the intensity of said beam when said beam is scanned over the image area, the improvement which comprises;
first means for sensing a parameter which varies with the average brightness of the image produced by said video signal and for producing a first control signal representative thereof;
second means for sensing a parameter which varies with tendencies for said index signal to become inadequate due to insufficient beam current when scanning relatively dark portions of said image area and for producing a second control signal representative thereof;
third means for clipping off at some level an extreme portion of said video signal, said level being controllable by said first control signal;
fourth means for acting on said video signal to control the average level thereof, said average level being controllable by said second control signal;
said third and fourth means being connected in cascade in the signal path by which said video signal is applied to the beam-intensity controlling element of said tube; and
means for supplying said first and second control signals to said third and fourth means respectively.

35. Apparatus in accordance with claim 34, in which said third means precedes said fourth means in said signal path.

36. Apparatus in accordance with claim 34, in which said fourth means comprises DC restorer means, said apparatus comprising AC coupling means connected between said third and fourth means in said signal path.

37. Apparatus in accordance with claim 34, in which said fourth means comprises DC restorer means supplied with said video signal for clamping it at a clamping level.

38. Apparatus in accordance with claim 37, in which said fourth means comprises means responsive to said second signal for varying said clamping level in the direction to oppose said tendency.

39. In a color television receiver including a color image-display cathode-ray tube, said tube comprising image-forming means including an image area in which the color television image is reproduced in response to color television signals received by said receiver and applied to the beam-intensity controlling means of said tube, said image-forming means having index elements dispersed through said image area for producing index signals indicative of beam position in response to impingement by said beam, said receiver also including viewer-adjustable controls whereby upon some combinations of adjustment of said controls and received television signals the intensity of said beam tends to become too small to produce best indexing signals at least during portions of the scanning of said image area, the improvement comprising:
automatic maximum blackness control means, comprising means for sensing those occasions during the scanning of said image area by said beam when said beam intensity tends to decrease to a level and for a time sufficient to produce said tendencies and for producing a control signal representative of the occurrence of said occasions, and means for shifting the D.C. level of said color television signals in response to said control signals to oppose said tendencies.

40. In a color television receiver including a color image-display cathode-ray tube, said tube comprising image-forming means including an image area in which the color television image is reproduced in response to color television signals received by said receiver and applied to the beam-intensity controlling means of said tube, said image-forming means having index elements dispersed through said image area for producing index signals indicative of beam position in response to impingement by said beam, said receiver also including viewer-adjustable controls whereby upon some combinations of adjustment of said controls and received television signals the intensity of said beam tends to become too small to produce best indexing signals at least during portions of the scanning of said image area, the improvement comprising:
automatic maximum blackness control means, comprising means for sensing those occasions during the scanning of said image area by said beam when said beam intensity tends to decrease to a level and for a time sufficient to produce said tendencies and for producing a control signal representative of the occurrence of said occasions, and means for shifting the D.C. level of said color television signals in response to said control signals to oppose said tendencies; and automatic brightness control means for limiting the maximum average brightness of said reproduced image.

41. In a color television system of the indexing type comprising a cathode-ray tube including beam-intensity control means, image-forming means responsive to repetitive forward scannings by said beam and to color video signals applied to said beam-intensity controlling means to produce a color-image and comprising index elements responsive to said forward scannings to produce index signals indicative of the position of said beam, some of said indexing elements being dispersed through the area in which said color image is formed, at least one of said index elements scanned at the beginning of each of said scannings constituting a starting index element; starting-index channel means supplied with index signals produced by said starting index element; and running-index channel means supplied with other signals produced by others of said index elements:

means for sensing occasions on which the intensity of said beam tends to fall to such a low level and for such a time that said other signals are of less than adequate strength, and for producing a control signal representative of the occurrence of such occasions; and means for shifting the D.C. level of said color video signals in response to said control signal to increase the intensity of said beam in response to the occurrence of said occasions;

first two-state electrical storage means;

second two-state electrical storage means;

first electrically-controllable switch means controllable to a first state in which said modifying means is effective and to a second state in which it is rendered ineffective;

second electrically-controllable switch means having a first state in which said beam-intensity controlling means is supplied with said color video signal and a second state in which said beam-intensity controlling means is connected to another terminal;

means responsive to forward scanning of said beam beyond said indexing elements to operate said first storage means to its first state;

means responsive to the existence of said first state of said first storage means for maintaining said first and second switch means in said second states thereof;

means responsive to the occurrence of said starting index signals at the beginning of a scanning to operate said first storage means to its second state;

means responsive to the existence of said second state of said first storage means for maintaining said first and second switch means in said first states thereof;

means responsive to the occurrence of the retrace of said beam after each of said scannings to operate said second storage means to its first state;

means responsive to the occurrence of said starting index signals to operate said second storage means to its second state; and means responsive to the existence of said second state of said second storage means for applying a pedestal signal to said other terminal of said second switch means.

42. Apparatus in accordance with claim 41 comprising means responsive to the existence of said second state of said first storage means for opening said starting index channel and responsive to the existence of said first state of said first storage means for closing said starting index channel.

43. Apparatus in accordance with claim 42, comprising means responsive to the existence of said second state of said first storage means for terminating said pedestal.

44. Apparatus in accordance with claim 42 comprising means responsive to a retrace of said scanning to operate said first storage means to said first state thereof on occasions when one of said forward scannings terminates before scanning beyond the last of said index elements.

45. In an image-display system comprising a cathode-ray tube and means for repeatedly scanning the beam of said tube back and forth over an image-display area therein in a line-by-line fashion, each line-scanning cycle being divisible into several time intervals, said tube having beam-intensity controlling means responsive to an input signal containing information to be displayed to produce an image in said area during forward scans of said beam, said tube comprising index elements dispersed through said area to produce ambiguous index signals in response to the scanning by said beam which ambiguously represent the position of said beam, said tube also comprising ambiguity-resolving means impinged by said beam during said scanning for producing ambiguity-resolving signals containing information enabling resolution of the ambiguity of said ambiguous index signals; first index circuits for processing said ambiguous index signals; second index circuits for processing said ambiguity-resolving signals; and third index circuits responsive to said first and second index signals for generating an unambiguous index signal:

means for modulating said beam current, during a first time interval including at least a portion of the time of forward scanning of said ambiguity-resolving means, with a waveform appropriate to assure an adequate level and duration of said ambiguity-resolving signals, thereby to assure proper initiation of generation of said unambiguous index signal;

means for initiating control of said beam-intensity by said input signal, after the termination of said first time interval, and for maintaining said beam control throughout a second time interval beginning after said first time interval, thereby to produce said image;

automatic control means operative during said second time interval for shifting the D.C. level of said input signal to further control said beam intensity, and responsive during said second time interval to the occurrence of tendencies for portions of said image area to become so dark as to interfere with proper production of said unambiguous signals, thereby to reduce said tendencies.

46. Apparatus in accordance with claim 45, in which said second time interval ends approximately upon the cessation of forward scanning of the said index elements along said line.

47. In an electronic image-display system of the class employing an image-display device responsive to an image-representing light-control signal derived from input signals for producing a viewable image in a predetermined image area of said device by controlled sequential actuation of successive portions of said image area by a scanning entity and having running index elements dispersed at specific locations in said image area for producing an index signal indicative of the times of actuation of said successive portions by said scanning entity, said index signal varying in strength in response to variations in the strength of said light-control signal and having a tendency under some conditions to fall below a predetermined minimum acceptable level:

means responsive to said index signal for producing an index signal-strength monitoring signal which varies with said index signal strength during said scanning of said image area;

first means for sensing said monitoring signal selectively when darker portions of said image are being actuated and for producing a control signal therefrom representative of the strength of said index signal during said actuation of said darker image portions; and second means responsive to said control signal for shifting the D.C. level of said light-control signal to oppose tendencies for said index signal strength to fall below said minimum acceptable level during said actuation of said darker portions of said image.

48. Apparatus in accordance with claim 47, wherein said second means also controls said light-control signal during actuation of other than said darker portions of said image.

49. Apparatus in accordance with claim 47, in which said second means is responsive to said monitoring signals to control the D.C. level of said light-control signal also during the sequential actuation of substantially all of said running index elements.

50. Apparatus in accordance with claim 47, in which said light-control signal comprises recurrent first signal intervals during which it produces a visual image, and recurrent second signal intervals during which it is non-representative of said visual image, and in which said sensing means is responsive to said monitoring signal during at least a portion of said first signal intervals.

51. Apparatus in accordance with claim 50, in which said sensing means is substantially non-responsive to said monitoring signal during most of said second intervals.

* * * * *

UNITED STATES PATENT OFFICE
CERTIFICATE OF CORRECTION

PATENT NO. : 3,977,022
DATED : August 24, 1976
INVENTOR(S) : David E. Sunstein

It is certified that error appears in the above-identified patent and that said Letters Patent are hereby corrected as shown below:

On page 1, column 1, "Conshohocken State Road, Bala Cynwyd, Pa. 19004" should read -- 9 Warton Road, Nashua, New Hampshire 03060--.

Signed and Sealed this second Day of August 1977

[SEAL]

Attest:

RUTH C. MASON
Attesting Officer

C. MARSHALL DANN
Commissioner of Patents and Trademarks